United States Patent
Saito et al.

(10) Patent No.: US 11,739,834 B2
(45) Date of Patent: Aug. 29, 2023

(54) OIL SUPPLY DEVICE AND VEHICLE DRIVE TRANSMISSION DEVICE

(71) Applicant: AISIN CORPORATION, Kariya (JP)

(72) Inventors: Naoki Saito, Anjo (JP); Aito Ide, Anjo (JP)

(73) Assignee: AISIN CORPORATION, Kariya (JP)

( * ) Notice: Subject to any disclaimer, the term of this patent is extended or adjusted under 35 U.S.C. 154(b) by 402 days.

(21) Appl. No.: 16/977,195

(22) PCT Filed: Apr. 25, 2019

(86) PCT No.: PCT/JP2019/017630
§ 371 (c)(1),
(2) Date: Sep. 1, 2020

(87) PCT Pub. No.: WO2019/208694
PCT Pub. Date: Oct. 31, 2019

(65) Prior Publication Data
US 2021/0003209 A1    Jan. 7, 2021

(30) Foreign Application Priority Data

Apr. 27, 2018 (JP) ................................ 2018-087635

(51) Int. Cl.
*F16H 61/12* (2010.01)
*F16H 57/04* (2010.01)
(Continued)

(52) U.S. Cl.
CPC .............. *F16H 61/12* (2013.01); *F16H 3/66* (2013.01); *F16H 57/0436* (2013.01);
(Continued)

(58) Field of Classification Search
CPC ........ F16H 61/12; F16H 3/66; F16H 57/0436; F16H 57/0441; F16H 57/0484;
(Continued)

(56) References Cited

U.S. PATENT DOCUMENTS 9,719,584 B1    8/2017   Duan et al.
2011/0220428 A1   9/2011   Ando
(Continued)

FOREIGN PATENT DOCUMENTS

CN    104728430 A    6/2015
CN    105026233 A    11/2015
(Continued)

OTHER PUBLICATIONS

Jun. 18, 2019 International Search Report issued in International Patent Application No. PCT/JP2019/017630.

*Primary Examiner* — Tisha D Lewis
(74) *Attorney, Agent, or Firm* — Oliff PLC

(57) ABSTRACT

An oil supply device has: a first hydraulic pump driven by power transmitted through a power transmission path; a second hydraulic pump driven by a second driving force source independent from the power transmission path; and a hydraulic circuit. In a specific state in which a first forward speed is formed by oil discharged from the second hydraulic pump being supplied to a hydraulic drive portion, when a failure occurs in which a discharge pressure of the second hydraulic pump is decreased, a state of the hydraulic circuit is switched from a first state in which oil discharged from the second hydraulic pump is supplied to the hydraulic drive portion to a second state in which oil discharged from the first hydraulic pump is supplied to the hydraulic drive portion.

20 Claims, 6 Drawing Sheets

(51) Int. Cl.
*F16H 3/66* (2006.01)
*F16H 61/00* (2006.01)
*F16H 61/02* (2006.01)

(52) U.S. Cl.
CPC ..... *F16H 57/0441* (2013.01); *F16H 57/0484* (2013.01); *F16H 61/0031* (2013.01); *F16H 61/0206* (2013.01); *F16H 2061/0037* (2013.01); *F16H 2061/1224* (2013.01); *F16H 2061/1264* (2013.01)

(58) Field of Classification Search
CPC ............. F16H 61/0031; F16H 61/0206; F16H 2061/0037; F16H 2061/1224; F16H 2061/1264; F16H 57/0435; F16H 57/0442; F16H 57/0473; F16H 2200/0034; F16H 2200/2005; F16H 2200/2066; F16H 2200/2082; F16H 3/54; F16H 2200/0021; F16H 2200/2035; B60K 17/02; B60K 17/08; B60K 2001/001; B60Y 2200/91
See application file for complete search history.

(56) References Cited

U.S. PATENT DOCUMENTS

| | | | |
|---|---|---|---|
| 2011/0269583 A1 | 11/2011 | Kawakami et al. | |
| 2014/0060676 A1* | 3/2014 | Wi | F16H 61/0025 137/565.01 |
| 2014/0060677 A1* | 3/2014 | Wi | F04B 49/002 137/565.01 |
| 2014/0060679 A1* | 3/2014 | Wi | F01M 1/16 137/565.3 |
| 2015/0167835 A1 | 6/2015 | Hwang | |
| 2015/0367793 A1 | 12/2015 | Ishikawa et al. | |
| 2016/0096518 A1* | 4/2016 | Li | F16H 61/12 701/29.2 |
| 2017/0268667 A1 | 9/2017 | Tachibanada et al. | |

FOREIGN PATENT DOCUMENTS

| | | |
|---|---|---|
| JP | 2001-74130 A | 3/2001 |
| JP | 2005-030430 A | 2/2005 |
| JP | 2010-36880 A | 2/2010 |
| JP | 2010-139028 A | 6/2010 |
| JP | 2010-236693 A | 10/2010 |
| JP | 2011-183947 A | 9/2011 |
| JP | 2017-166552 A | 9/2017 |

* cited by examiner

|  | F(D2) | C(D1) |
|---|---|---|
| Low | ○ |  |
| High | △ | ○ |
| Rev | ○ |  |

OIL SUPPLY DEVICE AND VEHICLE DRIVE TRANSMISSION DEVICE

TECHNICAL FIELD

The preferred embodiment relates to an oil supply device that supplies oil to a transmission, and a vehicle drive transmission device that is provided with such an oil supply device.

BACKGROUND ART

An example of the oil supply device described above is disclosed in Japanese Unexamined Patent Application Publication No. 2001-74130 (JP 2001-74130 A) (Patent Document 1). The reference symbols shown in parentheses in the description of the background art are those of Patent Document 1. As shown in FIG. 2 of Patent Document 1, the oil supply device of Patent Document 1 includes a first oil pump (31) that is an electric oil pump, and a second oil pump (33) that is an engine-driven oil pump. The oil supply device is configured to supply oil discharged from the first oil pump (31) to a friction engagement device (6) of a transmission main body (2) as hydraulic oil, and to also supply oil discharged from the second oil pump (33) to a driving force transmission element (13) as cooling lubricating oil. In the oil supply device, a first supply oil passage (32) to which oil discharged from the first oil pump (31) is supplied and a second supply oil passage (34) to which oil discharged from the second oil pump (33) is supplied are connected by a bypass line (36) having a check valve (35). Thus, when the first oil pump (31), which is an electric oil pump, fails, it is possible to supply oil from the second oil pump (33) to the first supply oil passage (32).

RELATED ART DOCUMENTS

Patent Documents

Patent Document 1: Japanese Unexamined Patent Application Publication No. 2001-74130 (JP 2001-74130 A)

SUMMARY OF THE INVENTION

Problem to be Solved by the Invention

A discharge capacity of the second oil pump is set to a capacity in which the cooling lubricating oil can be appropriately supplied to the driving force transmission element. Thus, when the configuration is such that the oil can be supplied from the second oil pump to the first supply oil passage, the discharge capacity of the second oil pump is needs to be increased in accordance with the amount of oil supplied from the second oil pump to the first oil supply passage.

In this regard, with the oil supply device of Patent Document 1, the oil is supplied from the second oil pump to the first oil supply passage when operation of the first oil pump is stopped, regardless of whether the first oil pump is out of order or whether the oil needs to be supplied to the first oil supply passage. Thus, the discharge capacity of the second oil pump needs to be set to a capacity in which the cooling lubricating oil can be appropriately supplied to the driving force transmission element that is the original supply destination, in any situation in which the operation of the first oil pump is stopped. As a result, it is necessary to set the discharge capacity of the second oil pump to a large value, and the energy loss caused by the second oil pump being driven tends to be large when the first oil pump is operating normally.

Therefore, desired is a technique with which the energy loss caused by a first hydraulic pump being driven can be decreased, when the oil supply device is provided with the first hydraulic pump that is driven by power transmitted in a power transmission path and a second hydraulic pump that is driven by a driving force source independent from the power transmission path.

Means for Solving the Problem

In view of the above, the characteristic configuration of an oil supply device that supplies oil to a transmission provided in a power transmission path connecting a first driving force source and wheels is as follows: the transmission is configured to form a first forward speed by hydraulic pressure being supplied to a specific engagement device; the oil supply device includes: a first hydraulic pump driven by power transmitted through the power transmission path; a second hydraulic pump driven by a second driving force source independent from the power transmission path; and a hydraulic circuit that supplies oil discharged by the first hydraulic pump or the second hydraulic pump to a hydraulic drive portion of the specific engagement device; and in a specific state in which the first forward speed is formed by oil discharged from the second hydraulic pump being supplied to the hydraulic drive portion, when a failure occurs in which a discharge pressure of the second hydraulic pump is decreased, a state of the hydraulic circuit is switched from a first supply state in which oil discharged from the second hydraulic pump is supplied to the hydraulic drive portion to a second supply state in which oil discharged from the first hydraulic pump is supplied to the hydraulic drive portion.

In the above configuration, when a failure occurs in the specific state, the state of the hydraulic circuit is switched from the first supply state to the second supply state. Thus, oil is supplied to the hydraulic drive portion of the specific engagement device from the first hydraulic pump instead of the second hydraulic pump, so that the state in which the first forward speed is formed can be maintained. Further, according to the configuration described above, the state of the hydraulic circuit is switched from the first supply state to the second supply state when a failure occurs in the specific state. Thus, the case in which the state of the hydraulic circuit is switched from the first supply state to the second supply state may be limited to a case in which a failure occurs in the specific state. For example, the configuration may be such that the state of the hydraulic circuit is not switched from the first supply state to the second supply state, when control is performed to stop the operation of the second hydraulic pump, or when a failure occurs in a state other than the specific state (for example, a state in which a shift speed different from the first forward speed is formed). In a situation in which a failure occurs in the specific state, hydraulic pressure that is at least at a degree in which the state in which the first forward speed is formed can be maintained need only be able to be supplied from the first hydraulic pump to the hydraulic drive portion. Thus, the maximum value of the discharge pressure required for the first hydraulic pump can be suppressed to be low. As a result, it is possible to suppress the discharge capacity of the first hydraulic pump to be low, and to reduce the energy loss that occurs in conjunction with the hydraulic pump being driven.

Further features and advantages of the oil supply device will be apparent from the following description of the embodiments which is given with reference to the drawings.

MODES FOR CARRYING OUT THE INVENTION

Embodiments of an oil supply device and a vehicle drive transmission device will be described with reference to the drawings.

In the following description, the term "drivingly coupled" refers to a state in which two rotating elements are coupled so as to be able to transmit a driving force (same meaning as a torque), and the state includes a state in which the two rotating elements are coupled so as to rotate integrally or a state in which the two rotating elements are coupled to be able to transmit the driving force via one or two or more transmission members. Examples of such a transmission member include various types of members that transmit rotation at the same speed or at a shifted speed, such as a shaft, a gear mechanism, a belt, and a chain. The transmission member may include an engagement device that selectively transmits a rotation and a driving force, such as a friction engagement device or a meshing engagement device. However, when each rotating element of a differential gear device or a planetary gear mechanism is "drivingly coupled", this indicates a state in which three or more rotating elements provided in the differential gear device or the planetary gear mechanism are drivingly coupled without interposing other rotating elements.

In addition, the term "rotating electrical machine" is used as a concept including all of a motor (electric motor), a generator (electric generator), and a motor generator that functions as both a motor and a generator as necessary.

Figure 1:
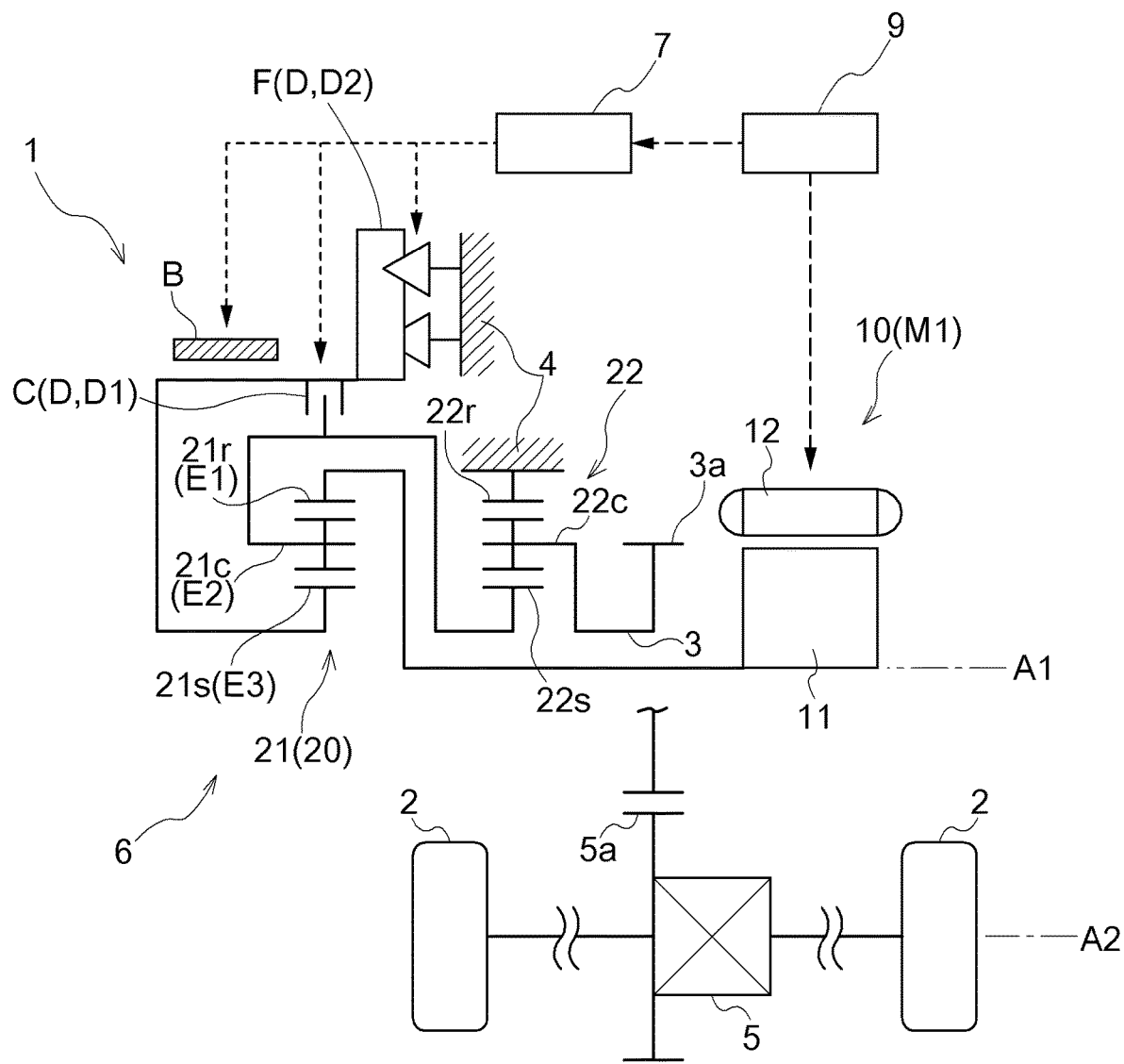
FIG. 1 is a skeleton diagram of a vehicle drive transmission device according to an embodiment.

As illustrated in FIG. 1, an oil supply device 7 is a device that supplies oil to a transmission 6 provided on a power transmission path that connects a first driving force source M1 and wheels 2. The oil supply device 7 sets as an oil supply target, the transmission 6 that is configured such that a first forward speed is formed by supplying hydraulic pressure to a specific engagement device D. In the present embodiment, the oil supply device 7 sets as the oil supply target, the transmission 6 that is configured such that the first forward speed is formed by supplying hydraulic pressure to the specific engagement device D, and a second forward speed having a larger speed ratio than that of the first forward speed is formed when supply of the hydraulic pressure to the specific engagement device D is stopped after the first forward speed is formed. The oil supply device 7 is provided in the vehicle drive transmission device 1 together with the transmission 6. Below, the configuration of the vehicle drive transmission device 1 will be described, and then the configuration of the oil supply device 7 provided in the vehicle drive transmission device 1 will be described.

As illustrated in FIG. 1, the vehicle drive transmission device 1 has the oil supply device 7, the transmission 6, and an output member 3 drivingly coupled to the wheels 2. The transmission 6 is provided in the power transmission path between the first driving force source M1 and the output member 3. The vehicle drive transmission device 1 is further provided with a case 4 that houses the transmission 6. The output member 3 is also housed in the case 4. The vehicle drive transmission device 1 is configured to be able to transmit the driving force of the first driving force source M1 to the output member 3. That is, the vehicle drive transmission device 1 is a device for transmitting the driving force of the first driving force source M1 to the output member 3 and making a vehicle (a vehicle in which the vehicle drive transmission device 1 is installed) travel. In the present embodiment, the case 4 corresponds to a "non-rotating member".

The first driving force source M1 is a driving force source of the wheels 2. In the present embodiment, the vehicle drive transmission device 1 is provided with a rotating electrical machine 10 that is the first driving force source M1 and the vehicle drive transmission device 1 is configured such that the torque of the rotating electrical machine 10 is transmitted to the output member 3. The vehicle drive transmission device 1 may be configured to transmit the drive force of the first driving force source M1 (such as an internal combustion engine) other than the rotating electrical machine 10 to the output member 3. Otherwise, the vehicle drive transmission device 1 may be configured such that the driving force of a plurality of the first driving force sources M1 (for example, the rotating electrical machine 10 and internal combustion engine) is transmitted to the output member 3. Here, the internal combustion engine is a motor (such as a gasoline engine or diesel engine) that is driven by fuel combustion inside the engine to output power.

In the present embodiment, the vehicle drive transmission device 1 includes an output differential gear device 5 in a power transmission path between the output member 3 and the two left and right wheels 2. The output differential gear device 5 is housed in the case 4. The output differential gear device 5 is provided with a differential input gear 5a that meshes with an output gear 3a provided in the output member 3, and distributes the torque input from the output member 3 to the differential input gear 5a to the two left and right wheels 2. The configuration may be such that a counter gear mechanism is provided in the power transmission path between the output member 3 and the output differential gear device 5, and the torque is input from the output member 3 to the output differential gear device 5 via the counter gear mechanism. Further, in the present embodiment, the configuration is such that the first driving force source M1 is drivingly coupled to the two left and right wheels 2 (that is, the configuration is such that the first driving force source M1 is the driving force source of the two wheels 2). However, the configuration may be such that the vehicle drive transmission device 1 does not have the output differential gear device 5 and that the first driving force source M1 is drivingly coupled to only one of the two wheels 2 (that is, the configuration may be such that the vehicle drive transmission device 1 transmits the driving force of the first driving force source M1 to only one of the two left and right wheels 2 and not the two left and right wheels 2).

The rotating electrical machine 10 is housed in the case 4. The rotating electrical machine 10 is provided with a stator 12 fixed to the case 4 and a rotor 11 supported so that the rotor 11 is rotatable relative to the stator 12. The rotating electrical machine 10 is electrically connected to an electricity storage device (not shown) such as a battery or a capacitor device, and performs power running by using electric power supplied from the electricity storage device or supplies electric power generated by inertial force of the vehicle etc. to the electricity storage device so as to store the electric power therein.

As illustrated in FIG. 1, the transmission 6 has a differential gear device 20. The differential gear device 20 is at least provided with, in an order of rotational speed, a first rotating element E1 that is drivingly coupled to the rotating electrical machine 10, a second rotating element E2 that is drivingly coupled to the output member 3, and a third rotating element E3 that is selectively fixed to the case 4 by a second engagement device D2. The first rotating element E1 is drivingly coupled to the rotating electrical machine 10 without interposing another rotating element provided in the differential gear device 20. The second rotating element E2 is drivingly coupled to the output member 3 without interposing another rotating element provided in the differential gear device 20.

Here, the term "an order of rotational speed" refers to the order of rotational speed of each rotational element in the rotational state. The rotational speed of each rotating element changes depending on the rotational state of the differential gear device or the planetary gear mechanism. However, the order of the rotational speed of each rotating element is determined by the structure of the differential gear device or the planetary gear mechanism and is therefore always the same. The term "the order of rotational speed of each rotating element" is equal to a disposition order of each rotating element in a speed diagram (see alignment chart, FIG. 2). Here, the term "the disposition order of each rotating element in a speed diagram" means the order in which an axis corresponding to each rotating element in the speed diagram (alignment chart) is disposed along a direction orthogonal to the axis. Although the disposition direction of the axis corresponding to each rotating element in the speed diagram (alignment chart) differs depending on how the speed diagram is drawn, the disposed order is fixed since it is determined by the structure of the differential gear device or the planetary gear mechanism.

In the present embodiment, the differential gear device 20 is configured of one planetary gear mechanism (first planetary gear mechanism 21), and has only three rotating elements, which are the first rotating element E1, the second rotating element E2, and the third rotating element E3. In the present embodiment, the first planetary gear mechanism 21 is a single-pinion type planetary gear mechanism. Then, in the present embodiment, a first ring gear 21r that is a ring gear of the first planetary gear mechanism 21 is drivingly coupled to the rotating electrical machine 10 and a first carrier 21c that is a carrier of the first planetary gear mechanism 21 is drivingly coupled to the output member 3, without interposing another rotating element of the first planetary gear mechanism 21. Specifically, the first ring gear 21r is coupled to the rotating electrical machine 10 (rotor 11) so that the first ring gear 21r rotates integrally therewith. The first carrier 21c is coupled to a rotating element (specifically, a second sun gear 22s) of a second planetary gear mechanism 22 described below that is provided in the power transmission path between the first planetary gear mechanism 21 and the output member 3, so that the first carrier 21c rotates integrally with the rotating element of the second planetary gear mechanism 22. Thus, in the present embodiment, the first ring gear 21r is the first rotating element E1, the first carrier 21c is the second rotating element E2, and a first sun gear 21s is the third rotating element E3. A configuration in which the first sun gear 21s is the first rotating element E1 and the first ring gear 21r is the third rotating element E3 is also possible. Also, a double pinion type planetary gear mechanism can be used as the first planetary gear mechanism 21.

In the present embodiment, the transmission 6 has the second planetary gear mechanism 22 in the power transmission path between the differential gear device 20 and the output member 3. The second planetary gear mechanism 22 is configured to reduce the speed of the rotation input from the first planetary gear mechanism 21 at a speed ratio corresponding to the gear ratio of the second planetary gear mechanism 22 and transmit the resultant rotation to the output member 3. Specifically, the second planetary gear mechanism 22 is a single pinion type planetary gear mechanism. The second sun gear 22s that is the sun gear of the second planetary gear mechanism 22 is coupled to the first carrier 21c so that the second sun gear 22s rotates integrally. A second carrier 22c that is a carrier of the second planetary gear mechanism 22 is coupled to the output member 3 so that the second carrier 22c rotates integrally. A second ring gear 22r that is a ring gear of the second planetary gear mechanism 22 is fixed to the case 4. The configuration may be such that the transmission 6 is not provided with the second planetary gear mechanism 22 and the second rotating element E2 of the differential gear device 20 is coupled to the output member 3 so that the second rotating element E2 rotates integrally.

As illustrated in FIG. 1, in the present embodiment, the rotating electrical machine 10, the output member 3, and the transmission 6 are disposed coaxially (here, on a first axis A1). In contrast, the output differential gear device 5 is disposed on a second axis A2 that is parallel with the first axis A1 and that is different from the first axis A1. Here, the first axis A1 and the second axis A2 are virtual axes. In the present embodiment, the second planetary gear mechanism 22 is disposed between the differential gear device 20 (first planetary gear mechanism 21) and the rotating electrical machine 10 in an axial direction that is based on the first axis A1. The configuration may be such that the second planetary gear mechanism 22 disposed on the opposite side of the differential gear device 20 (first planetary gear mechanism 21) from the rotating electrical machine 10 side in the axial direction that is based on the first axis A1.

As described above, in the present embodiment, the transmission 6 is configured such that the first forward speed is formed by supplying hydraulic pressure to the specific engagement device D, and the second forward speed having a larger speed ratio than that of the first forward speed is formed when supply of the hydraulic pressure to the specific engagement device D is stopped after the first forward speed is formed. In the present embodiment, the transmission 6 is provided with the first engagement device D1 and the second engagement device D2 that are two specific engagement devices D. As described above, the second engagement device D2 is an engagement device that selectively fixes the third rotating element E3 of the differential gear device 20 to the case 4. In the present embodiment, the first engagement device D1 is a clutch C that selectively couples two rotating elements among the first rotating element E1, the second rotating element E2, and the third rotating element E3. That is, two rotating elements among the first rotating element E1, the second rotating element E2, and the third rotating element E3 are coupled by first engagement device D1 in an engagement state (an engaged state; the same applies hereinafter). The first rotating element E1 is drivingly coupled to the rotating electrical machine 10 without interposing the first engagement device D1, and the second rotating element E2 is drivingly coupled to the output member 3 without interposing the first engagement device D1.

The clutch C is a normally open type engagement device, and is configured to be engaged when the hydraulic pressure is supplied and released when supply of the operating hydraulic pressure is stopped. That is, in the first engagement device D1 (clutch C), hydraulic pressure is supplied to a first hydraulic drive portion 71 (see FIG. 4) that is a hydraulic drive portion 70 (such as a hydraulic servo mechanism etc.) of the first engagement device D1 so that the first engagement device D1 is switched to the engagement state. The first engagement device D1 (clutch C) is switched to the released state by the supply of hydraulic pressure to the first hydraulic drive portion 71 being stopped. In the present embodiment, the clutch C is provided so as to couple the second rotating element E2 and the third rotating element E3 when the clutch C is in the engagement state. In the present embodiment, a friction engagement device is used as the clutch C.

The second engagement device D2 is configured so as to at least be able to be switched between a one-direction restriction state in which rotation of the third rotating element E3 is restricted to one direction and a rotation restriction state in which rotation of the third rotating element E3 is restricted in both directions. That is, in the present embodiment, the second engagement device D2 is a one-way clutch F (selectable one-way clutch). The second engagement device D2 (one-way clutch F) is switched to the one-direction restriction state by having hydraulic pressure supplied to a second hydraulic drive portion 72 (see FIG. 4) that is the hydraulic drive portion 70 of the second engagement device D2. The second engagement device D2 (one-way clutch F) is switched to the rotation restriction state by having the supply of hydraulic pressure to the second hydraulic drive portion 72 stopped. In this specification, a clutch configured using a two-way clutch (selectable two way clutch) is also called a one way clutch. Here, the two-way clutch is able to switch between another direction restriction state in which rotation in another one direction of the third rotating element is restricted and a restriction disabled state in which rotation of the third rotating element E3 is allowed in both directions, in addition to the one-direction restriction state and the rotation restriction state.

Figures 2, 3:
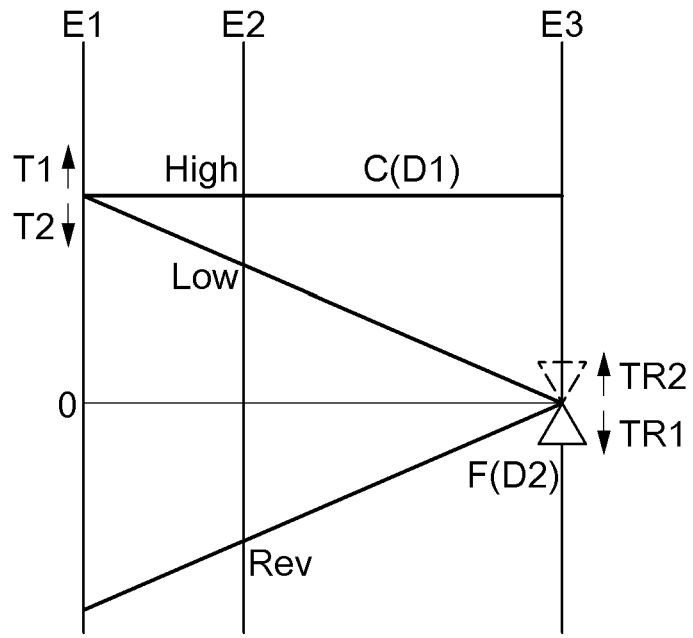
FIG. 2 is a speed diagram of a differential gear device according to the embodiment.
FIG. 3 is an operation table of a transmission according to the embodiment.

A first reaction force torque TR1 is defined as a reaction force torque that is applied to the third rotating element E3 when the rotating electrical machine 10 outputs a normal rotation torque T1 in a forward power running direction, and a second reaction force torque TR2 is defined as a reaction force torque that is applied to the third rotating element E3 when the rotating electrical machine 10 outputs a reverse rotation torque T2 that is in a direction opposite to the normal rotation torque T1 is (see FIG. 2). In this case, in the one-direction restriction state, the one-way clutch F is configured to restrict rotation of the third rotating element E3 in the rotation direction caused by the first reaction force torque TR1 and allow rotation of the third rotating element E3 in the rotation direction caused by the second reaction force torque TR2. That is, the one-way clutch F is engaged by the first reaction force torque TR1 applied to the third rotating element E3 and released by the second reaction force torque TR2 applied to the third rotating element E3, in the one-direction restriction state. Thus, rotation of the third rotating element E3 in one direction (rotation in the rotation direction due to the first reaction force torque TR1) is restricted. That is, with the rotation direction of the second rotating element E2 set as the positive direction while the vehicle is travelling forward, the one-way clutch F restricts rotation of the third rotating element E3 in a negative direction and allows rotation of the third rotating element E3 in the positive direction, in the one-direction restriction state. Further, in the rotation restriction state, the one-way clutch F restricts rotation (rotation in the negative direction) of the third rotating element E3 in the rotation direction caused by the first reaction force torque TR1 and also restricts rotation (rotation in the positive direction) of the third rotating element E3 in the rotation direction caused by the second reaction force torque TR2.

As the one-way clutch F configured as described above, a combination of a first one way clutch and a second one way clutch that are two one way clutches can be used, for example. Here, the first one-way clutch is configured so as to be able to switch between a restriction effective state in which rotation of the third rotating element E3 in the positive direction is restricted and rotation of the third rotating element in the negative direction is allowed, and the restriction disabled state in which rotation of the third rotating element E3 in both directions is allowed. The second one-way clutch is configured to restrict rotation of the third rotating element E3 in the negative direction and allow rotation of the third rotating element E3 in the positive direction.

The transmission 6 has the first engagement device D1 (in the present embodiment, the clutch C) and the second engagement device D2 (in the present embodiment, the one-way clutch F) having the above-described configurations. Thus, as illustrated in FIG. 2, a first forward speed and a second forward speed with a larger speed ratio than that of the first forward speed (a ratio of the rotation speed of the first driving force source M1 to the rotation speed of the output member 3) can be formed so as to be switchable, as shift speeds for forward travelling in which the normal rotation torque T1 of the rotating electrical machine 10 is transmitted to the wheels 2 to make the vehicle travel forward. In FIG. 2, the first forward speed that is a higher shift speed among the first forward speed and the second forward speed is expressed as "High", and the second forward speed that is a lower shift speed among the first forward speed and the second forward speed is expressed as "Low". Further, the reverse speed in which the reverse rotation torque T2 of the rotating electrical machine 10 is transmitted to the wheels 2 so that the vehicle travels rearward is expressed as "Rev".

FIG. 3 shows an operation table of the transmission 6. In the operation table of FIG. 3, for the one-way clutch F, a triangular mark indicates the one-direction restriction state and a circle mark indicates the rotation restriction state. Further, in the operation table of FIG. 3, for the clutch C, a circle mark indicates the engagement state and unmarked indicates the released state.

As illustrated in FIG. 3, the first forward speed (High) is formed by switching the clutch C to the engagement state (direct coupling engagement state) and switching the one-way clutch F to the one-direction restriction state. As indicated in FIG. 2, in the first forward speed (High), all the rotating elements of the first planetary gear mechanism 21 are rotated integrally at the same speed, and rotation input from the rotating electrical machine 10 side to the first rotating element E1 is output from the second rotating element E2 to the output member 3 side at the same rotating speed. Further, the second forward speed (Low) is formed by switching the clutch C to the released state and the one-way clutch F to the rotation restriction state. As illustrated in FIG. 2, in the second forward speed (Low), rotation input from the rotating electrical machine 10 side to the first rotating element E1 is decelerated at a speed ratio corresponding to the gear ratio of the first planetary gear mechanism 21, and is output from the second rotating element E2 to the output member 3 side. During forward power running, the second forward speed (Low) can be formed even when the one-way clutch F is switched to the one-direction restriction state. However, by switching the one-way clutch F to the rotation restriction state, regenerative running at the second forward speed (Low) is possible. Further, the reverse speed (Rev) is formed by switching the clutch C to the released state and the one-way clutch F to the rotation restriction state.

As illustrated in FIG. 1, in the present embodiment, the transmission 6 has a brake B besides the second engagement device D2 as a device for selectively fixing the third rotating element E3 of the differential gear device 20 to the case 4. In this way, by engaging the brake B (slip engagement) while releasing the clutch C when switching the shift speed from the first forward speed (High) to the second forward speed (Low), the rotation speed of the third rotating element E3 can be reduced. In particular, by engaging the brake B, the rotation speed of the third rotating element E3 can be reduced even when the second reaction force torque TR2 corresponding to the reverse rotation torque T2 of the rotating electrical machine 10 is applied to the third rotating element E3. Thus, it is possible to switch the shift speed from the first forward speed (High) to the second forward speed (Low) during regenerative traveling.

In the present embodiment, the brake B is a normally open type brake, and is configured to be engaged when the hydraulic pressure is supplied and released when supply of the hydraulic pressure is stopped. That is, the brake B is switched to the engagement state by hydraulic pressure being supplied to a third hydraulic drive portion 73 (see FIG. 4) that is a hydraulic drive portion of the brake B. Further, the brake B is switched to the released state by supply of the hydraulic pressure to the third hydraulic drive portion 73 being stopped. In the present embodiment, a band brake having a cylindrical drum and a strip-shaped friction material serving as an engaging member is used as the brake B. A multi-plate frictional engagement element may be used as the brake B. Further, the configuration may be such that the transmission 6 does not have the brake B.

As illustrated in FIG. 1, the vehicle drive transmission device 1 has a control device 9 that controls an engagement state of the first engagement device D1 (in the present embodiment, an engagement state of the clutch C) and an engagement state of the second engagement device D2 (in the present embodiment, a state of the one-way clutch F in which switching is performed between the one-direction restriction state and the rotation restriction state), and an engagement state of the brake B. The control device 9 also controls driving of the first driving force source M1 (in the present embodiment, the rotating electrical machine 10) and driving of a second driving force source M2 (see FIG. 4) described below. The control device 9 has a calculation processing device such as a central processing unit (CPU) as a core member and has a storage device such as a random access memory (RAM) or a read only memory (ROM) that can be referred to by the calculation processing device. Each function of the control device 9 is realized by software (a program) stored in the storage device such as the ROM, hardware such as a calculation circuit that is provided separately, or both of them. The control device 9 may be configured by a collection of a plurality of pieces of hardware (a plurality of separated pieces of hardware) that can communicate with each other.

The control device 9 is configured to be able to acquire information (sensor detection information) of detection results of various sensors provided in the vehicle. The sensor detection information is, for example, information of an accelerator operation amount information, information of a vehicle speed, and information of a state of charge or an amount of electricity stored in the electricity storage device that supplies electric power to the rotating electrical machine 10. The control device 9 refers to a control map etc. to determine a target shift speed to be formed in the transmission 6 and a target torque of the rotating electrical machine 10 based on the sensor detection information. Then, the control device 9 controls the engagement state of each of the first engagement device D1, the second engagement device D2, and the brake B via the oil supply device 7 so that the determined target shift speed is formed. Further, the control device 9 controls the rotating electrical machine 10 so as to output the determined target torque. Although details are omitted, the control device 9 controls driving of the rotating electrical machine 10 by controlling an inverter device that converts a direct current voltage of the power storage device into an alternating voltage and supplies the alternating voltage to the rotating electrical machine 10.

Figure 4:
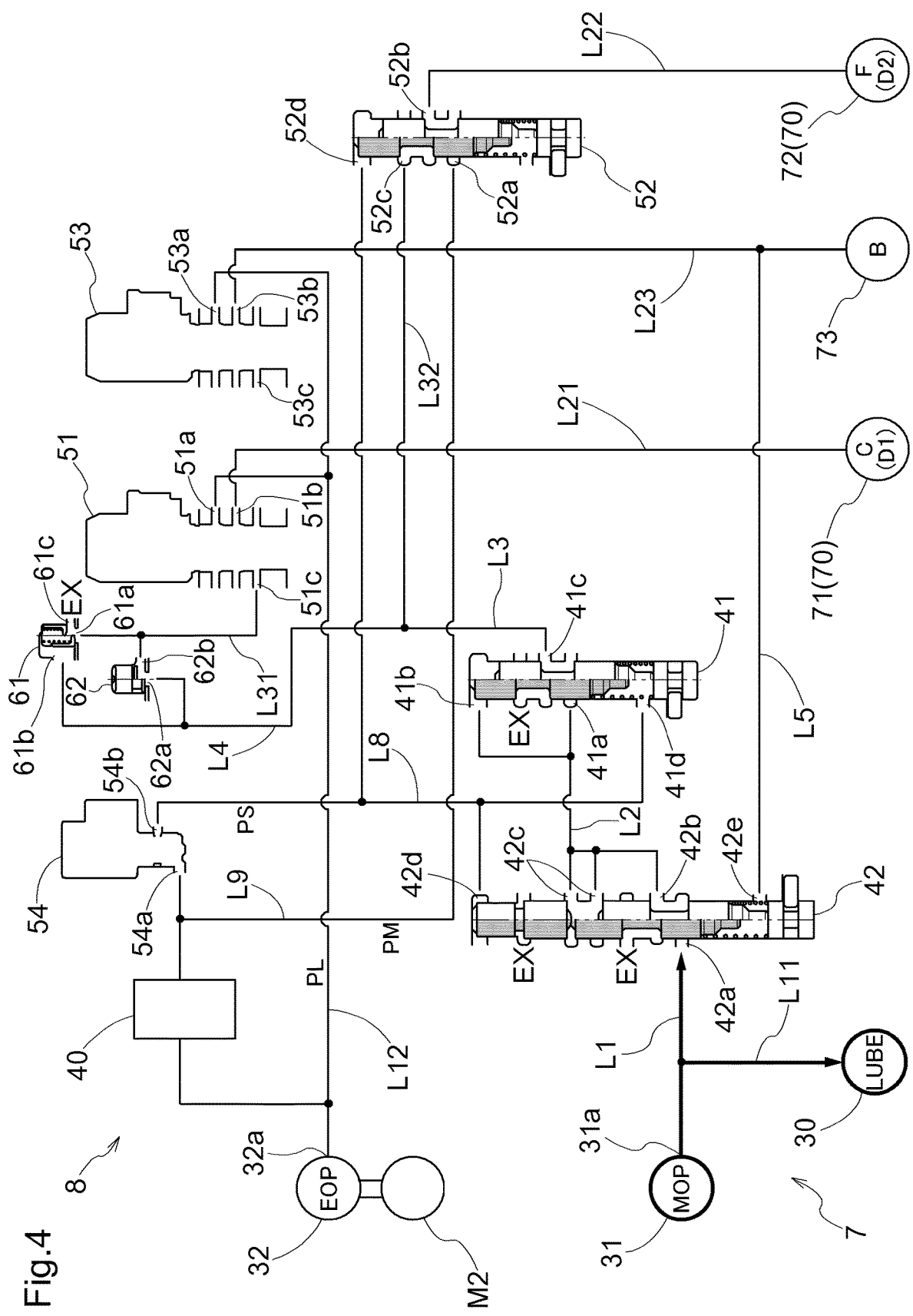
FIG. 4 is a schematic diagram of an oil supply device according to the embodiment.

Next, the configuration of the oil supply device 7 according to the present embodiment will be described. As illustrated in FIG. 4, the oil supply device 7 has a first hydraulic pump 31, a second hydraulic pump 32, and a hydraulic circuit 8 that supplies oil discharged from the first hydraulic pump 31 or the second hydraulic pump 32 to the hydraulic drive portion 70 (in the present embodiment, the first hydraulic drive portion 71 and the second hydraulic drive portion 72) of the specific engagement device D. The first hydraulic pump 31 and the second hydraulic pump 32 each suck oil stored in an oil storage portion provided in a lower portion of the case 4 or the like to generate hydraulic pressure. An internal gear pump, an external gear pump, a vane pump or the like can be used as the first hydraulic pump 31 and the second hydraulic pump 32, for example.

The first hydraulic pump 31 is a pump driven by power transmitted through a power transmission path connecting the first driving force source M1 and the wheels 2. That is, the first hydraulic pump 31 is a so-called mechanical oil pump, and in FIG. 4, the first hydraulic pump 31 is referred to as a mechanical oil pump (MOP). In the present embodiment, the first hydraulic pump 31 is configured to be driven in conjunction with rotation of the wheels 2. The first hydraulic pump 31 is driven in conjunction with rotation of the wheels 2 by being coupled to the output member 3 or the differential input gear 5a so that the first hydraulic pump 31 is non-detachable. In the present embodiment, a discharge capacity of the first hydraulic pump 31 is smaller than the discharge capacity of the second hydraulic pump 32. A configuration in which the discharge capacity of the first hydraulic pump 31 is equal to the discharge capacity of the second hydraulic pump 32, or a configuration in which the discharge capacity of the first hydraulic pump 31 is larger than the discharge capacity of the second hydraulic pump 32 is also possible.

The second hydraulic pump 32 is the second hydraulic pump 32 that is driven by the second driving force source M2 independent from the power transmission path connecting the first driving force source M1 and the wheels 2. In the present embodiment, the second driving force source M2 is an electric motor. That is, the second hydraulic pump 32 is a so-called electric oil pump, and in FIG. 4, the second hydraulic pump 32 is referred to as an electric oil pump (EOP).

As illustrated in FIG. 4, oil discharged by the first hydraulic pump 31 is supplied to a lubrication target part 30 (indicated as LUBE in FIG. 4), which is a lubrication required part, via a first supply oil passage L11. The first supply oil passage L11 is provided with an oil cooler (not shown) that cools the oil and the oil cooled by the oil cooler is supplied to the lubrication target part 30. The lubrication target part 30 includes gears, bearings, and the rotating electrical machine 10 etc. that are provided in the vehicle drive transmission device 1, and these are lubricated and cooled by the oil supplied via the first supply oil passage L11. The gears and the bearings provided in the transmission 6 are included in the lubrication target part 30. That is, the oil supply device 7 has the first supply oil passage L11 for supplying oil discharged from the first hydraulic pump 31 to the lubrication target part 30 (lubrication required part) of the transmission 6. A required hydraulic pressure of the lubrication target part 30 is lower than a required hydraulic pressure of the hydraulic drive portion 70 (such as a line pressure PL). Thus, the first hydraulic pump 31 is driven to supply the oil to a hydraulic circuit that has a lower pressure than the hydraulic circuit to which oil discharged from the second hydraulic pump 32 is supplied, during a normal state in which failure of the second hydraulic pump 32 has not occurred. In this way, with the oil supply device 7, oil discharged from the first hydraulic pump 31 can be supplied to the lubrication target part 30. Thus, compared to when oil discharged from the second hydraulic pump 32 is supplied to the lubrication target part 30, it is possible to suppress a required discharge amount (in particular, the maximum required discharged amount) of the second hydraulic pump 32 to be small. Therefore, cost reduction and efficiency improvement can be achieved, and the size of the second hydraulic pump 32 can be reduced.

In contrast, the second hydraulic pump 32 is driven to supply the oil to the hydraulic drive portion 70 of the specific engagement device D. Specifically, the hydraulic circuit 8 has control valves (51, 52), which control the hydraulic pressure to be supplied to the hydraulic drive portion 70, in the oil passage that connects a second discharge port 32a that is the discharge port of the second hydraulic pump 32 and the hydraulic drive portion 70. In the present embodiment, the hydraulic circuit 8 has a first control valve 51 that controls the hydraulic pressure supplied to the first hydraulic drive portion 71, in the oil passage (the oil passage including a second supply oil passage L12 and a first control oil passage L21) that connects the second discharge port 32a and the first hydraulic drive portion 71. Further, the hydraulic circuit 8 has a second control valve 52 that controls the hydraulic pressure supplied to the second hydraulic drive portion 72, in the oil passage (the oil passage including the second supply oil passage L12, a modulator pressure oil passage L9, and a second control oil passage L22) that connects the second discharge port 32a and the second hydraulic drive portion 72. As described above, the oil supply device 7 has the second supply oil passage L12 that supplies oil discharged from the second hydraulic pump 32 to the hydraulic drive portion 70 of the specific engagement device D. In the oil supply device 7, oil discharged from the second hydraulic pump 32 can be supplied to the hydraulic drive portion 70 of the specific engagement device D. It is thus possible to suppress the required discharge capacity (in particular, the maximum required discharge pressure) of the first hydraulic pump 31 to be small. In this way, energy loss due to the driving of the first hydraulic pump 31 can be reduced, efficiency can be improved, and the size of the first hydraulic pump 31 can be reduced.

The first control valve 51 has an input port 51a to which oil is input from the second discharge port 32a side, an output port 51b that is in communication with the hydraulic drive portion 70 (first hydraulic drive portion 71), and a drain port 51c that is in communication with a first drain oil passage L31. The second control valve 52 has an input port 52a to which oil is input from the second discharge port 32a side, an output port 52b in communication with the hydraulic drive portion 70 (second hydraulic drive portion 72), and a drain port 52c that is in communication with a second drain oil passage L32. The output port 51b of the first control valve 51 is in communication with the first hydraulic drive portion 71 via the first control oil passage L21. The output port 52b of the second control valve 52 is in communication with the second hydraulic drive portion 72 via the second control oil passage L22. In the present embodiment, the first control valve 51 and the second control valve 52 each correspond to a "control valve" and the first drain oil passage L31 and the second drain oil passage L32 each correspond to a "drain oil passage".

In the present embodiment, the hydraulic circuit 8 further has a third control valve 53 that controls the hydraulic pressure supplied to a third hydraulic drive portion 73, in an oil passage (an oil passage including the second supply oil passage L12 and a third control oil passage L23) that connects the second discharge port 32a and the third hydraulic drive portion 73. The third control valve 53 has an input port 53a to which oil is input from the second discharge port 32a side, an output port 53b that is in communication with the third hydraulic drive portion 73, and a drain port 53c that is in communication with a drain oil passage (not shown). The output port 53b of the third control valve 53 is in communication with the third hydraulic drive portion 73 via the third control oil passage L23.

Oil discharged by the second hydraulic pump 32 is supplied to the second supply oil passage L12. The hydraulic pressure in the second supply oil passage L12 is adjusted to the line pressure PL by a line pressure adjusting valve (not shown). Then, the hydraulic pressure (line pressure PL) of the second supply oil passage L12 is input to the input port 51a of the first control valve 51 and is also input to the input port 53a of the third control valve 53. Further, the hydraulic circuit 8 has a modulator valve 40 that reduces the hydraulic pressure (line pressure PL) in the second supply oil passage L12 to generate a modulator pressure PM. The hydraulic pressure (modulator pressure PM) generated by the modulator valve 40 is output to the modulator pressure oil passage L9, and the hydraulic pressure of the modulator pressure oil passage L9 (modulator pressure PM) is input to the input port 52a of the second control valve 52.

The first control valve 51 and the third control valve 53 are linear solenoid valves that adjust (continuously adjust) the hydraulic pressure supplied to a downstream side according to an applied current. The first control valve 51 adjusts the hydraulic pressure input to the input port 51a according to the applied current and supplies the adjusted hydraulic pressure to the first hydraulic drive portion 71. The third control valve 53 adjusts the hydraulic pressure supplied to the input port 53a according to the applied current and supplies the adjusted hydraulic pressure to the third hydraulic drive portion 73. The first control valve 51 and the third control valve 53 are normally closed-type linear solenoid valves that close when not energized. That is, when the first control valve 51 is not energized, the output port 51b and the drain port 51c are in communication with each other and the hydraulic pressure input to the input port 51a is shut off. When the third control valve 53 is not energized, the output port 53b and the drain port 53c are in communication with each other and the hydraulic pressure input to the input port 53a is cut off.

Figure 5:
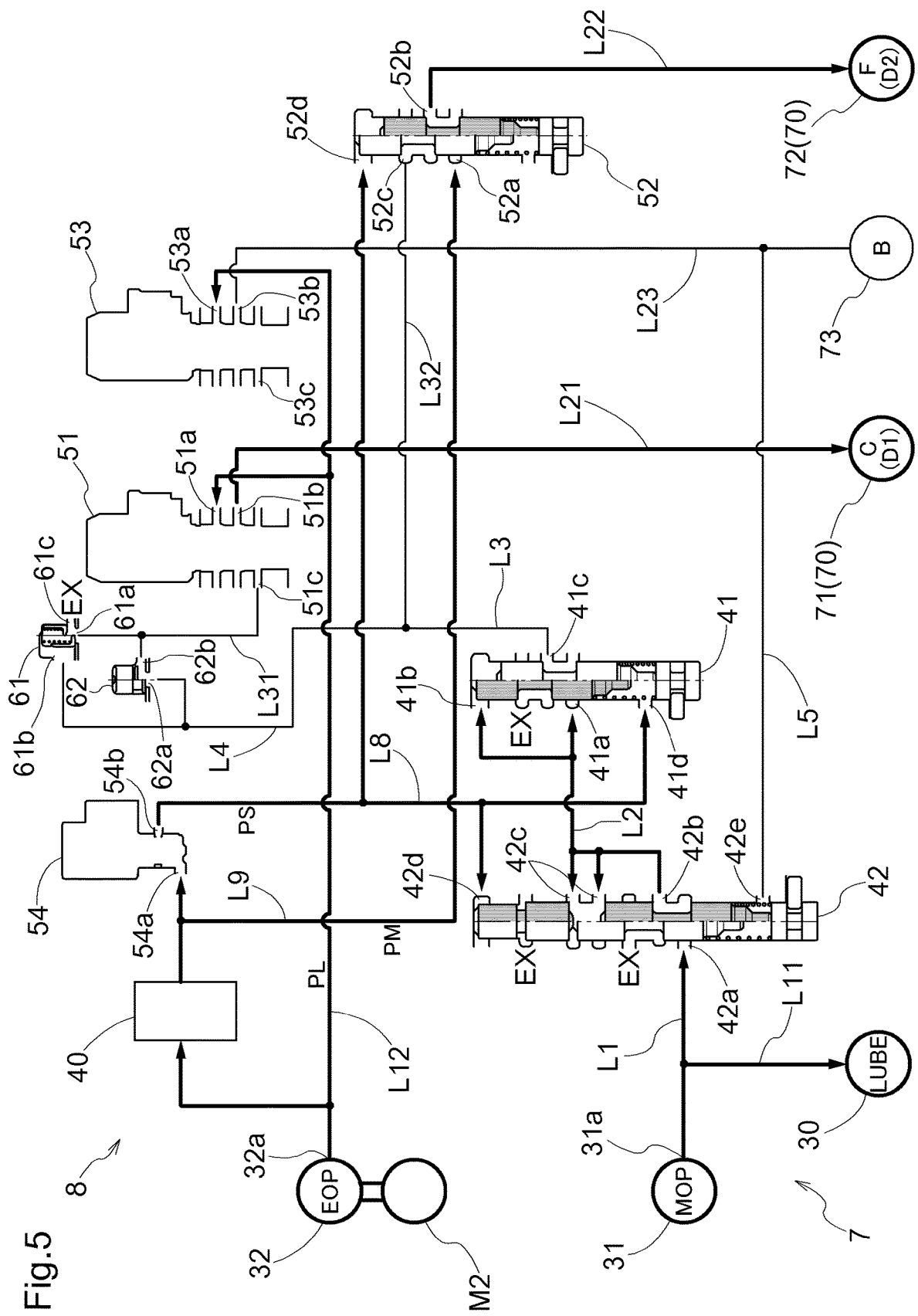
FIG. 5 is a diagram of an oil flow in a first state of the oil supply device according to the embodiment.
Figure 6:
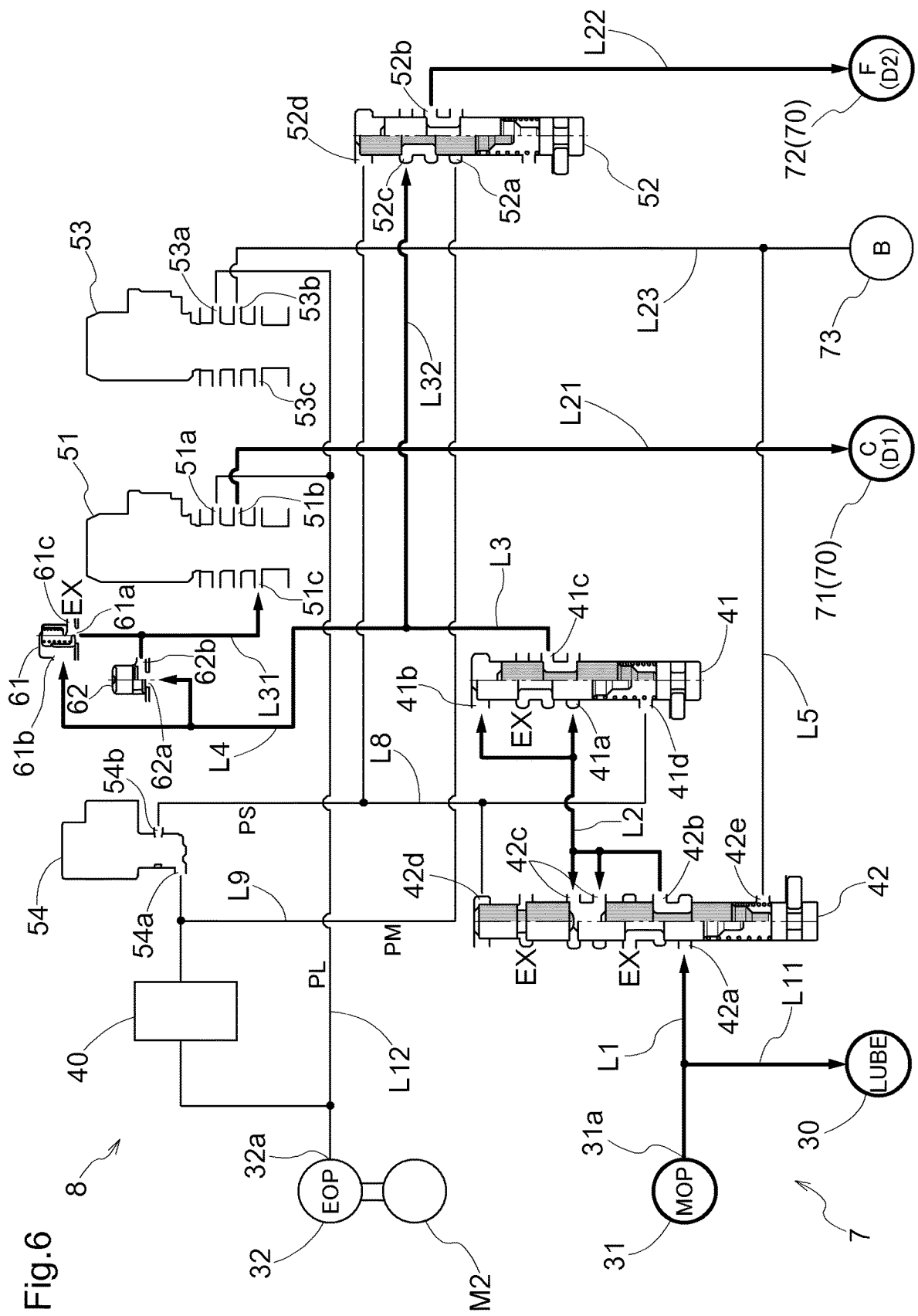
FIG. 6 is shows an oil flow in a second state of the oil supply device according to the embodiment.

The second control valve 52 is a switching valve that can switch a communication state between the ports according to the input hydraulic pressure (signal pressure PS). Specifically, the second control valve 52 is provided with a signal pressure input port 52d in addition to the input port 52a, the output port 52b, and the drain port 52c. The state of the second control valve 52 is switched to a state in which the input port 52a and the output port 52b are in communication with each other and communication between the output port 52b and the drain port 52c is blocked, when the signal pressure PS is input to the signal pressure input port 52d (the state shown in FIG. 5). Further, the state of the second control valve 52 is switched to a state in which communication between the input port 52a and output port 52b is blocked and the output port 52b and the drain port 52c are in communication, when no signal pressure PS is input to the signal pressure input port 52d (states shown in FIG. 4 and FIG. 6). In FIG. 4 to FIG. 6, for the second control valve 52 and a first switching valve 41 and a second switching valve 42 described below, a spool (valve element) sliding inside the sleeve is divided into two and two states are indicated and the spools are indicated as hatched in the state of each drawing.

The hydraulic circuit 8 is provided with a fourth control valve 54 that generates the signal pressure PS input to the signal pressure input port 52d of the second control valve 52. Specifically, the fourth control valve 54 uses the hydraulic pressure (in the present embodiment, the modulator pressure PM) input from the second discharge port 32a side to an input port 54a provided in the fourth control valve 54 as a source pressure to generate the signal pressure PS. The signal pressure PS generated by the fourth control valve 54 is output from an output port 54b of the fourth control valve 54 to a signal pressure oil passage L8, and the hydraulic pressure (signal pressure PS) of the signal pressure oil passage L8 is input to the signal pressure input port 52d of the second control valve 52.

The fourth control valve 54 is an on/off solenoid valve that adjusts the presence or absence of hydraulic pressure supply to the downstream side (switches the presence or absence of hydraulic pressure supply) according to the applied current. That is, the fourth control valve 54 switches whether to output the signal pressure PS to the signal pressure oil passage L8 in accordance with the applied current. The fourth control valve 54 is a normally closed solenoid valve that closes when not energized. That is, the state of the fourth control valve 54 is switched to a state in which the input port 54a and the output port 54b are in communication with each other when energized, and is switched to a state in which communication between the input port 54a and the output port 54b is blocked when not energized. Thus, when the fourth control valve 54 is energized, the signal pressure PS (the hydraulic pressure approximately the same as the modulator pressure PM) is output to the signal pressure oil passage L8, and when the fourth control valve 54 is not energized, output of the signal pressure PS to the signal pressure oil passage L8 is stopped.

The control device 9 controls the supply state of electric power (energized state) to each of the first control valve 51, the third control valve 53, and the fourth control valve 54, thereby switching the shift speed formed in the transmission 6. As described above, the second forward speed (Low) and the reverse speed (Rev) are formed by switching the clutch C to the released state and the one-way clutch F to the rotation restriction state. Then, the clutch C is switched to the released state by stopping supply of the hydraulic pressure to the first hydraulic drive portion 71, and the one-way clutch F is switched to the rotation restriction state by stopping supply of the hydraulic pressure to the second hydraulic drive portion 72. Thus, as illustrated in FIG. 4, when the second forward speed (Low) and the reverse speed (Rev) are formed, there is no need to supply hydraulic pressure to the first hydraulic drive portion 71, the second hydraulic drive portion 72, and the third hydraulic drive portion 73 and the second hydraulic pump 32 is therefore stopped. In FIG. 4, the oil passage through which the oil flows while the second forward speed (Low) and the reverse speed (Rev) are formed is emphasized (the line segment is thicker than the other oil passages). Similarly in FIG. 5 and FIG. 6, the oil passages through which the oil flows are emphasized in the states shown in each drawing.

As described above, the first forward speed (High) is formed by switching the clutch C to the engagement state and the one-way clutch F to the one-direction restriction state. The clutch C is switched to the engagement state by supplying hydraulic pressure to the first hydraulic drive portion 71, and the one-way clutch F is switched to the one-direction restriction state by supplying hydraulic pressure to the second hydraulic drive portion 72. Thus, as illustrated in FIG. 5, when forming the first forward speed (High), it is necessary to supply hydraulic pressure to the first hydraulic drive portion 71 and the second hydraulic drive portion 72, and the second hydraulic pump 32 is driven and oil discharged from the second hydraulic pump 32 is supplied to the first hydraulic drive portion 71 and the second hydraulic drive portion 72. Here, since the first control valve 51 is energized, the hydraulic pressure (for example, the line pressure PL) adjusted by the first control valve 51 with the line pressure PL as the source pressure is supplied to the first hydraulic drive portion 71 as a hydraulic pressure. Further, due to the fourth control valve 54 being energized and the signal pressure PS being input to the signal pressure input port 52d of the second control valve 52, the input port 52a and the output port 52b of the second control valve 52 are in communication. Thus, the modulator pressure PM is supplied to the second hydraulic drive portion 72 as the hydraulic pressure.

When a failure in which the discharge pressure of the second hydraulic pump 32 is reduced occurs (hereinafter simply referred to as a "failure") in a specific state in which oil discharged from the second hydraulic pump 32 is supplied to the hydraulic drive portion 70 (in the present embodiment, the first hydraulic drive portion 71 and the second hydraulic drive portion 72) so that the first forward speed (High) is formed, there is a possibility that supply of the hydraulic pressure to the first hydraulic drive portion 71 and the second hydraulic drive portion 72 is stopped and the second forward speed (Low) is forcibly formed. Such a failure may occur due to an abnormality in the second hydraulic pump 32, power supply to the oil supply device 7 being blocked, or the like. In view of this point, in the oil supply device 7, the configuration is such that when a failure occurs in the specific state, the state of the hydraulic circuit 8 is switched from a first supply state in which oil discharged from the second hydraulic pump 32 is supplied to the hydraulic drive portion 70 (the state shown in FIG. 5) to a second supply state (the state shown in FIG. 6) in which oil discharged from the first hydraulic pump 31 is supplied to the hydraulic drive portion 70. Then, in the present embodiment, the configuration is such that in the second supply state, the state in which the first forward speed is formed is maintained by oil discharged from the first hydraulic pump 31. In this way, when a failure occurs in the specific state, a state in which the first forward speed (High) is formed can be maintained by supplying the oil to the hydraulic drive portion 70 from the first hydraulic pump 31 instead of the second hydraulic pump 32. The configuration of the hydraulic circuit 8 of the present embodiment for realizing such a configuration will be described below.

As illustrated in FIG. 4, the hydraulic circuit 8 is provided with the first switching valve 41 in an oil passage that connects the hydraulic drive portion 70 and the first discharge port 31*a* that is a discharge port of the first hydraulic pump 31 (the oil passage including a first oil passage L1, a second oil passage L2, and a third oil passage L3). The first switching valve 41 is configured to be able to switch between a first allowing state (a state shown in FIG. 6) in which the oil is allowed to flow from the first discharge port 31*a* side to the hydraulic drive portion 70 side and a first blocked state (a state shown in FIG. 4 and FIG. 5) in which the oil is blocked from flowing from the first discharge port 31*a* side to the hydraulic drive portion 70 side.

Specifically, the first switching valve 41 is provided with a first input port 41*a* and a second input port 41*b* to which oil is input from the first discharge port 31*a* side, an output port 41*c* that outputs the oil to the hydraulic drive portion 70 side, and a signal pressure input port 41*d* to which the signal pressure PS is input. In the present embodiment, the oil is input to the first input port 41*a* and the second input port 41*b* through a second oil passage L2 that connects the first switching valve 41 and a second switching valve 42 described below. The oil output from the output port 41*c* is supplied to the hydraulic drive portion 70 side via a third oil passage L3. The signal pressure PS is input to the signal pressure input port 41*d* via the signal pressure oil passage L8.

As illustrated in FIG. 5, the first switching valve 41 is configured such that the first blocked state (the state in which the first input port 41*a* and the output port 41*c* are blocked) is maintained (specifically, a biasing force of the spring for biasing the spool is adjusted) when the signal pressure PS is input to the signal pressure input port 41*d*, even when the oil is input to the second input port 41*b* from the first discharge port 31*a* side. Further, as illustrated in FIG. 4, the first switching valve 41 is configured such that the first blocked state is maintained even when the signal pressure PS is not input to the signal pressure input port 41*d* and the oil is not input to the second input port 41*b* from the first discharge port 31*a* side. Thus, the state of the first switching valve 41 is switched to the first blocked state during a state in which a failure is not occurring in the specific state (the state shown in FIG. 5) or a state in which the second forward speed (Low) is formed (the state shown in FIG. 4).

In contrast, as illustrated in FIG. 6, the first switching valve 41 is configured such that the first allowing state (the state in which the first input port 41*a* and the output port 41*c* are in communication) is maintained when the signal pressure PS is input to the signal pressure input port 41*d* and the oil is input to the second input port 41*b* from the first discharge port 31*a* side. If a failure occurs in the specific state, the fourth control valve 54 is automatically non-energized or is non-energized by being controlled by the control device 9, and the signal pressure PS is not output to the signal pressure oil passage L8, that is, the signal pressure PS is not input to the signal pressure input port 41*d*. Thus, the state of the first switching valve 41 is switched to the first allowing state when a failure occurs in the specific state.

The hydraulic circuit 8 has the second switching valve 42 on an upstream side of the first switching valve 41 in the oil passage connecting the first discharge port 31*a* and the hydraulic drive portion 70. The second switching valve 42 is configured so as to be able to switch between a second allowing state (the state shown in FIG. 5 and FIG. 6) in which the oil is allowed to flow from the first discharge port 31*a* side to the first switching valve 41 side and a second blocked state (the state shown in FIG. 4) in which the flow of the oil from the first discharge port 31*a* side to the first switching valve 41 side is blocked.

Specifically, the second switching valve 42 is provided with an input port 42*a* to which the oil is input from the first discharge port 31*a* side, an output port 42*b* that outputs the oil to the first switching valve 41 side, a holding pressure input port 42*c* to which the oil output to the first switching valve 41 side is input, a signal pressure input port 42*d* to which the signal pressure PS is input, and a switching pressure input port 42*e* to which hydraulic pressure supplied to the third hydraulic drive portion 73 is input. In the present embodiment, the oil is input to the input port 42*a* via a first oil passage L1 that is formed to branch from the first supply oil passage L11. The oil output from the output port 42*b* is input to the holding pressure input port 42*c*, the first input port 41*a* of the first switching valve 41, and the second input port 41*b* of the first switching valve 41 via the second oil passage L2. The signal pressure PS is input to the signal pressure input port 42*d* via the signal pressure oil passage L8. The oil is input to the switching pressure input port 42*e* via a fifth oil passage L5 formed to branch from the third control oil passage L23.

As illustrated in FIG. 4, the second switching valve 42 is configured such that the second blocked state (the state in which the input port 42*a* and the output port 42*b* are blocked) is basically maintained when the signal pressure PS is not input to the signal pressure input port 42*d*. When the second forward speed (Low) or the reverse speed (Rev) is formed, the second hydraulic pump 32 is stopped. Thus, the signal pressure PS is not output to the signal pressure oil passage L8, that is, the signal pressure PS is not input to the signal pressure input port 42*d*. Therefore, when the second forward speed (Low) or the reverse speed (Rev) is formed (the state shown in FIG. 4), the state of the second switching valve 42 is switched to the second blocked state.

In contrast, as illustrated in FIG. 5, the second switching valve 42 is configured such that the second allowing state (the state in which the input port 42*a* and the output port 42*b* are in communication) is maintained when the signal pressure PS is input to the signal pressure input port 42*d*. When forming the first forward speed (High), the fourth control valve 54 is energized and the signal pressure PS is output to the signal pressure oil passage L8. Thus, the state of the second switching valve 42 is switched to the second allowing state in the specific state. As illustrated in FIG. 5, in the second allowing state, the hydraulic pressure output from the output port 42*b* of the second switching valve 42 is input to the holding pressure input port 42*c* as a holding pressure for holding a position of the spool of the second switching valve 42 (a holding pressure input state). The configuration is such that when the signal pressure PS is not input to the signal pressure input port 42d in the holding pressure input state (see FIG. 6), the state of the second switching valve 42 is maintained in the second allowing state by the holding pressure input to the holding pressure input port 42c. When a failure occurs in the specific state, the signal pressure PS is not output to the signal pressure oil passage L8, that is, the signal pressure PS is not input to the signal pressure input port 42d. Thus, in the present embodiment, when a failure occurs in the specified state, the state of the second switching valve 42 is maintained in the second allowing state by the hydraulic pressure (specifically, the hydraulic pressure supplied from the first discharge port 31a side to the holding pressure input port 42c via the input port 42a and the output port 42b) supplied to the second switching valve 42 from the first discharge port 31a side.

As described above, when a failure occurs in the specific state, the state of the first switching valve 41 is switched to the first allowing state and the state of the second switching valve 42 is maintained in the second allowing state. In this way, the configuration is such that when a failure occurs in the specific state, the state of the hydraulic circuit 8 is switched from the first supply state (the state shown in FIG. 5) to the second supply state (the state shown in FIG. 6). Although details are omitted, in the present embodiment, the control device 9 is configured to supply hydraulic pressure to the third hydraulic drive portion 73 when switching the shift speed from the first forward speed (High) to the second forward speed (Low) so as to engage the brake B. Thus, when performing control to switch the shift speed from the first forward speed (High) to the second forward speed (Low), the state of the second switching valve 42 is switched to the second blocked state by the hydraulic pressure input to the switching pressure input port 42e of the second switching valve 42. Also, since the state of the second switching valve 42 is switched to the second blocked state so that the oil of the second oil passage L2 is discharged from a drain port of the second switching valve 42, the state of the first switching valve 41 is maintained in the first blocked state. In this way, the state of the hydraulic circuit 8 is not switched to the second supply state, and the second forward speed (Low) is formed.

As illustrated in FIG. 4, in present embodiment, the hydraulic circuit 8 is provided with the second switching valve 42. Thus, when the second forward speed (Low) or the reverse speed (Rev) is formed, the oil is not supplied to the second oil passage L2. Thus, even when a failure occurs when the second forward speed (Low) or the reverse speed (Rev) is formed, the state of the hydraulic circuit 8 is maintained in the state shown in FIG. 4 and the state in which the second forward speed (Low) or the reverse speed (Rev) is formed is maintained. That is, in the present embodiment, the configuration is such that the state of the hydraulic circuit 8 can be switched from the first supply state to the second supply state only when a failure occurs in the specific state.

As illustrated in FIG. 6, in the present embodiment, the configuration is such that in the second supply state, oil discharged from the first hydraulic pump 31 is sequentially passed through the drain ports (51c, 52c) and the output ports (51b, 52b) of the control valves (51, 52) to be supplied to the hydraulic drive portion 70. That is, in the second supply state, oil discharged by the first hydraulic pump 31 is sequentially passed through the drain port 51c and the output port 51b of the first control valve 51 to be supplied to the first hydraulic drive portion 71, and oil discharged by the first hydraulic pump 31 is sequentially passed through the drain port 52c and the output port 52b of the second control valve 52 to be supplied to the second hydraulic drive portion 72.

Specifically, as illustrated in FIG. 6, the first drain oil passage L31 that is in communication with the drain port 51c of the first control valve 51 is provided with a first check valve 61 that is switched from a closed state to an open state in conjunction with the increase in the hydraulic pressure in the first drain oil passage L31 and that allows the oil to be discharged from the inside to the outside of the first drain oil passage L31. The first drain oil passage L31 is in communication with an input port 61a of the first check valve 61. Thus, when the oil supplied to the first hydraulic drive portion 71 is discharged from the drain port 51c of the first control valve 51, the first check valve 61 is switched to the open state by the hydraulic pressure supplied from the drain port 51c to the input port 61a of the first check valve 61 via the first drain oil passage L31 and thus, oil discharged from the drain port 51c is discharged from the drain port 61c of the first check valve 61. In the present embodiment, the first check valve 61 corresponds to a "check valve".

As described above, the oil output from the output port 41c of the first switching valve 41 is supplied to the third oil passage L3. As illustrated in FIG. 6, a fourth oil passage L4 is connected to the third oil passage L3, and a second check valve 62 that is switched from the closed state to the open state in conjunction with the increase of the hydraulic pressure in the fourth oil passage L4 and that allows the oil to flow from the fourth oil passage L4 to the first drain oil passage L31 is provided in a connection portion of the fourth oil passage L4 and the first drain oil passage L31. Thus, when the state of the first switching valve 41 is switched to the first allowing state due to the occurrence of a failure in the specific state, the second check valve 62 is switched to the open state by the hydraulic pressure that is supplied from the output port 41c of the first switching valve 41 to be sequentially passed through the third oil passage L3 and the fourth oil passage L4 to an input port 62a of the second check valve 62 and thus, the oil output from the output port 41c of the first switching valve 41 is reverse input to the drain port 51c of the first control valve 51 via the first drain oil passage L31. The fourth oil passage L4 is also in communication with a back pressure input port 61b of the first check valve 61. The first check valve 61 is maintained in the closed state by the hydraulic pressure that is supplied from the output port 41c of the first switching valve 41 to be sequentially passed through the third oil passage L3 and the fourth oil passage L4 to the back pressure input port 61b of the first check valve 61. That is, in the second supply state, the first check valve 61 is maintained in the closed state by the hydraulic pressure supplied from the first discharge port 31a side to the first control valve 51.

When a failure occurs in the specific state, the first control valve 51 is automatically non-energized or is non-energized by the control of the control device 9 and thus, the drain port 51c and the output port 51b are in communication. In this way, in the second supply state, oil discharged from the first hydraulic pump 31 is sequentially passed through the drain port 51c and the output port 51b of the first control valve 51 to be supplied to the first hydraulic drive portion 71.

In contrast, as illustrated in FIG. 6, the second drain oil passage L32 that is in communication with the drain port 52c of the second control valve 52 is connected to the third oil passage L3. Then, the state of the first switching valve 41 is switched to the first blocked state (the state shown in FIG. 5) while a failure is not occurring in the specific state, and is set to the state in which the output port 41c of the first switching valve 41 and the drain port of the first switching valve 41 are in communication. Thus, when the hydraulic pressure supplied to the second hydraulic drive portion 72 is discharged from the drain port 52c of the second control valve 52, oil discharged from the drain port 52c is sequentially passed through the second drain oil passage L32 and the third oil passage L3 to be supplied to the first switching valve 41 and is discharged from the drain port of the first switching valve 41.

In contrast, the state of the first switching valve 41 is switched to the first allowing state (the state shown in FIG. 6) due to a failure occurring in the specific state, the oil output from the output port 41c of the first switching valve 41 is reversely input to the drain port 52c of the second control valve 52 via the third oil passage L3 and the second drain oil passage L32. When a failure occurs in the specific state, the signal pressure PS is not output to the signal pressure oil passage L8, that is, the signal pressure PS is not input to the signal pressure input port 52d of the second control valve 52. Thus, the state of the second control valve 52 is switched to a state in which communication between the input port 52a and the output port 52b is blocked and the output port 52b and the drain port 52c are in communication. In this way, as illustrated in FIG. 6, in the second supply state, oil discharged from the first hydraulic pump 31 is sequentially passed through the drain port 52c and the output port 52b of the second control valve 52 to be supplied to the second hydraulic drive portion 72.

Other Embodiments

Next, other embodiments of the oil supply device and the vehicle drive transmission device will be described.

(1) The configuration of the hydraulic circuit 8 shown in the above embodiment is an example, and the configuration of the hydraulic circuit 8 can be changed appropriately. For example, in the embodiment described above, described as an example is the configuration in which in the second supply state, the first check valve 61 is maintained in the closed state by the hydraulic pressure supplied from the first discharge port 31a side to the first control valve 51 (specifically, the hydraulic pressure supplied from the output port 41c of the first switching valve 41 to the first control valve 51). However, without being limited to such a configuration, in the second supply state for example, the first check valve 61 can be maintained in the closed state by the oil supplied from a different output port of the first control valve 51 to the back pressure input port 61b of the first check valve 61.

In the embodiment described above, described as an example is the configuration in which in the second supply state, oil discharged from the first hydraulic pump 31 is sequentially passed through the drain ports (51c, 52c) and the output ports (51b, 52b) of the control valves (51, 52) to be supplied to the hydraulic drive portion 70. However, without being limited to such a configuration, the configuration may be such that in the second supply state, oil discharged by the first hydraulic pump 31 is sequentially passed through ports other than the drain ports (51c, 52c) and the output ports (51b, 52b) of the control valves (51, 52) to be supplied to the hydraulic drive portion 70. Otherwise, the configuration may be such that in the second supply state, oil discharged by the first hydraulic pump 31 is supplied to the hydraulic drive portion 70 without interposing the control valves (51, 52).

Further, in the embodiment described above, described as an example is the configuration in which when a failure occurs in the specific state, the state of the second switching valve 42 is maintained in the second allowing state by the hydraulic pressure supplied from the first discharge port 31a side to the second switching valve 42 (specifically, the hydraulic pressure supplied from the first discharge port 31a side to be output from the output port 42b of the second switching valve 42). However, without being limited to such an configuration, the configuration may be such that when a failure occurs in the specific state, the state of the second switching valve 42 is maintained in the second allowing state by the hydraulic pressure supplied from an output port of a vale different from the second switching valve 42 to the holding pressure input port 42c of the second switching valve 42.

Further, in the embodiment described above, described as an example is the configuration in which the hydraulic circuit 8 has the second switching valve 42. However, without being limited to such a configuration, the configuration may be such that the hydraulic circuit 8 is not provided with the second switching valve 42. In such a case, for example, when a failure occurs while the second forward speed (Low) is formed, the hydraulic circuit 8 may be structured so that the state of the hydraulic circuit 8 may be switched to the second supply state and the first forward speed (High) may be formed.

Figure 7:
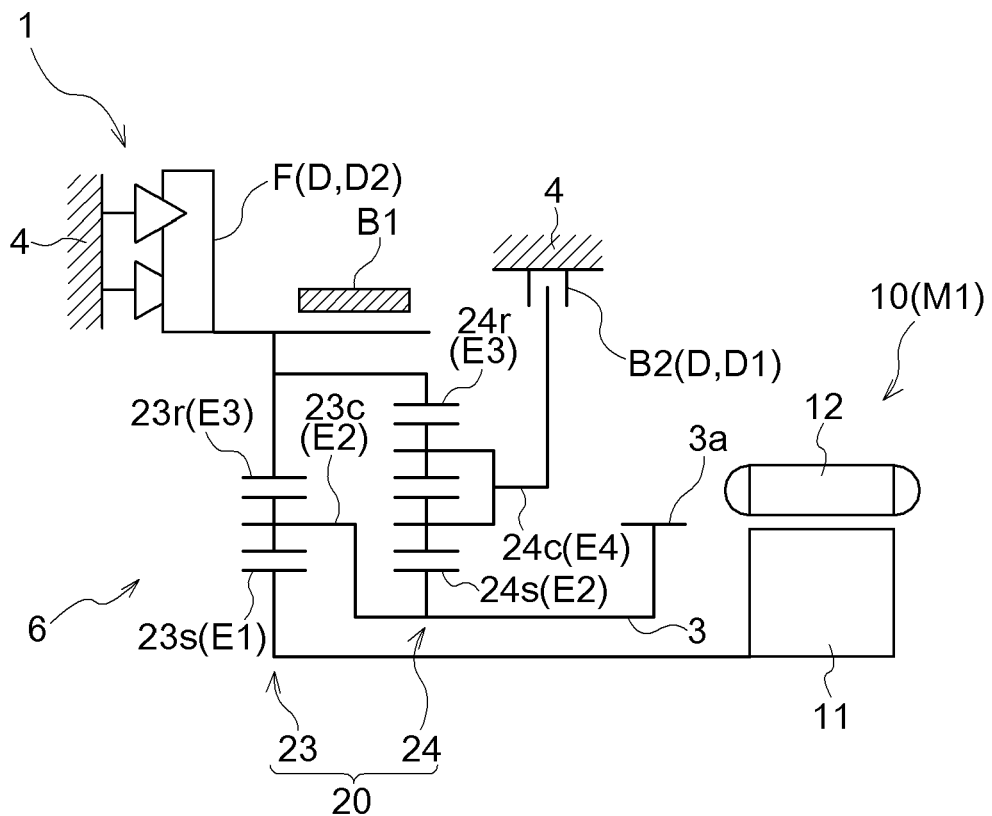
FIG. 7 is a skeleton diagram of a vehicle drive transmission device according to another embodiment.

(2) The configuration of the transmission 6 shown in the above embodiment is an example. The transmission 6 having a different configuration from that of the embodiment described above may be the oil supply target of the oil supply device 7, if the transmission 6 is configured to form the first forward speed by having the hydraulic pressure supplied to the specific engagement device D. For example, the transmission 6 configured as shown in FIG. 7 can be the oil supply target of the oil supply device 7. Similar to the transmission 6 of the embodiment described above, the transmission 6 shown in FIG. 7 is the transmission 6 having the configuration in which the second forward speed having a speed ratio larger than that of the first forward speed is formed when the supply of the hydraulic pressure to the specific engagement device D is stopped in the state in which the first forward speed is formed. For example, the transmission 6 having the configuration in which a forward speed having a speed ratio smaller than that of the first forward speed is formed when supply of hydraulic pressure to the specific engagement device D is stopped in the state in which the first forward speed is formed, may be the oil supply target of the oil supply device 7.

In the example shown in FIG. 7, unlike the embodiment described above, the differential gear device 20 has the first rotating element E1, the second rotating element E2, the third rotating element E3, and a fourth rotating element E4 fixed to the case 4 by the first engagement device D1 in an engagement state, in the order of rotation speed. Specifically, the differential gear device 20 is configured by combining two planetary gear mechanisms (a third planetary gear mechanism 23 and a fourth planetary gear mechanism 24). Of the three rotating elements each provided in the third planetary gear mechanism 23 and the fourth planetary gear mechanism 24, the rotating elements are coupled two by two so as to rotate integrally with each other. In this way, the differential gear device 20 having four rotating elements as a whole is formed.

In the example shown in FIG. 7, as the third planetary gear mechanism 23, a single pinion type planetary gear mechanism having a third sun gear 23s, a third carrier 23c, and a third ring gear 23r is used, and as the fourth planetary gear mechanism 24, a double pinion type planetary gear mechanism having a fourth sun gear 24s, a fourth carrier 24c, and a fourth ring gear 24r is used. The third sun gear 23s is a first rotating element E1, the third carrier 23c and the fourth sun gear 24s that are coupled so as to rotate integrally with each other are the second rotating element E2, the third ring gear 23r and the fourth ring gear 24r that are coupled so as to rotate integrally with each other are the third rotating element E3, and the fourth carrier 24c is the fourth rotating element E4. The configuration may be such that the coupling relationship between the third planetary gear mechanism 23 and the fourth planetary gear mechanism 24 is different from the example shown in FIG. 7. A configuration using a double pinion type planetary gear mechanism as the third planetary gear mechanism 23, a configuration using a single pinion type planetary gear mechanism as the fourth planetary gear mechanism 24, or a combination thereof are also possible. Further, the differential gear device 20 may be configured by a Ravigneaux type planetary gear mechanism.

Figure 8:
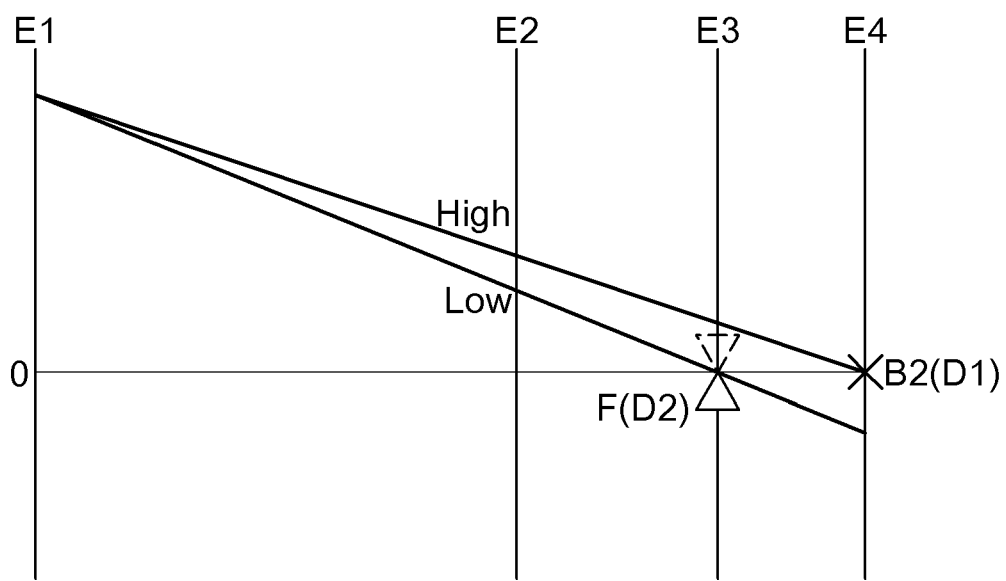
FIG. 8 is a speed diagram of a differential gear device according to the other embodiment.

In the example shown in FIG. 7, the transmission 6 includes a first brake B1 corresponding to the brake B in the embodiment described above. In the transmission 6, unlike the embodiment described above, the first engagement device D1 is a brake (second brake B2) that selectively fixes the fourth rotating element E4 of the differential gear device 20 to the case 4. Specifically, the first engagement device D1 is a normal open type brake. In the example shown in FIG. 7, as shown in FIG. 8, the rotation input to the first rotating element E1 from the rotating electrical machine 10 side is decelerated and output from the second rotating element E2 to the output member 3 side, even when the first forward speed (High) is formed in addition to when the second forward speed (Low) is formed.

(3) In the above embodiment, the second engagement device D2 has been described as an example in which the second engagement device D2 is the one-way clutch F capable of switching between at least the one-direction restriction state and the rotation restriction state. However, without being limited to such a configuration, it is also possible to use a normal closed type brake as the second engagement device D2. That is, the second engagement device D2 is switched to the released state by the hydraulic pressure being supplied to the second hydraulic drive portion 72 and the second engagement device D2 can be switched to the engagement state by the supply of the hydraulic pressure to the second hydraulic drive portion 72 being stopped.

(4) In the embodiment described above, a configuration is described as an example in which the transmission 6 includes two specific engagement devices D that are the first engagement device D1 and the second engagement device D2, as the specific engagement device D to which the hydraulic pressure is supplied when forming the first forward speed. However, without being limited to such a configuration, the transmission 6 may be configured to include only one specific engagement device D or three or more specific engagement devices D.

(5) The configuration disclosed in the each embodiment described above may be applied in combination with the configuration disclosed in the other embodiments as long as no contradiction occurs (including combinations of the embodiments described above as the other embodiments). Regarding the other configurations, the embodiments disclosed in the present specification are merely examples in all respects. Thus, various modifications can be appropriately made without departing from the spirit of the present disclosure.

Summary of the Above Embodiment

Hereinafter, a summary of the oil supply device and the vehicle drive transmission device described above will be described.

An oil supply device (7) that supplies oil to a transmission (6) provided in a power transmission path connecting a first driving force source (M1) and wheels (2), and the transmission (6) is configured to form a first forward speed by hydraulic pressure being supplied to a specific engagement device (D), the oil supply device (7) including: a first hydraulic pump (31) driven by power transmitted through the power transmission path; a second hydraulic pump (32) driven by a second driving force source (M2) independent from the power transmission path; and a hydraulic circuit (8) that supplies oil discharged by the first hydraulic pump (31) or the second hydraulic pump (32) to a hydraulic drive portion (70) of the specific engagement device (D), in which in a specific state in which the first forward speed is formed by oil discharged from the second hydraulic pump (32) being supplied to the hydraulic drive portion (70), when a failure occurs in which a discharge pressure of the second hydraulic pump (32) is decreased, a state of the hydraulic circuit (8) is switched from a first supply state in which oil discharged from the second hydraulic pump (32) is supplied to the hydraulic drive portion (70) to a second supply state in which oil discharged from the first hydraulic pump (31) is supplied to the hydraulic drive portion (70).

In the above configuration, when a failure occurs in the specific state, the state of the hydraulic circuit (8) is switched from the first supply state to the second supply state. Thus, oil is supplied from the first hydraulic pump (31), instead of the second hydraulic pump (32), to the hydraulic drive portion (70) of the specific engagement device (D) to maintain the state in which the first forward speed is formed.

Moreover, according to the above configuration, the state of the hydraulic circuit (8) is switched from the first supply state to the second supply state when a failure occurs in the specific state. Thus, the case in which the state of the hydraulic circuit (8) is switched from the first supply state to the second supply state may be limited to a case in which a failure occurs in the specific state. For example, the configuration may be such that the state of the hydraulic circuit (8) is not switched from the first supply state to the second supply state, when control is performed to stop the operation of the second hydraulic pump (32), or when a failure occurs in a state other than the specific state (for example, a state in which a shift speed different from the first forward speed is formed). In a situation in which a failure occurs in the specific state, hydraulic pressure that is at least at a degree in which the state in which the first forward speed is formed can be maintained need only be able to be supplied from the first hydraulic pump (31) to the hydraulic drive portion (70). Thus, the maximum value of the discharge pressure required for the first hydraulic pump (31) can be suppressed to be low. As a result, it is possible to suppress the discharge capacity of the first hydraulic pump (31) to be low, and to reduce the energy loss that occurs in conjunction with the first hydraulic pump (31) being driven.

Here, in the second supply state, it is preferable that a state in which the first forward speed is formed be maintained by oil discharged from the first hydraulic pump (31).

According to this configuration, in the second supply state, it is not necessary to supply hydraulic pressure, which is required for the shifting operation, from the first hydraulic pump (31) to the transmission (6), and the first hydraulic pump (31) may be capable of supplying hydraulic pressure at a degree in which the state in which the first forward speed can be maintained. Thus, the discharge capacity of the first hydraulic pump (31) can be suppressed to be small compared to a case in which the transmission (6) performs a shifting operation with oil discharged from the first hydraulic pump (31) in the second supply state.

It is preferable that a discharge capacity of the first hydraulic pump (31) be smaller than a discharge capacity of the second hydraulic pump (32).

According to this structure, it is possible to suppress the discharge capacity of the hydraulic pump (31) to a degree at which the discharge capacity of the first hydraulic pump (31) is smaller than the discharge capacity of the second hydraulic pump (32). Thus, it is possible to further reduce the energy loss that occurs in conjunction with the first hydraulic pump (31) being driven.

It is preferable that the transmission (6) be configured to form a second forward speed having a larger speed ratio than that of the first forward speed when supply of the hydraulic pressure to the specific engagement device (D) is stopped in a state in which the first forward speed is formed.

When the transmission (6) is configured as described above, if the supply of hydraulic pressure to the specific engagement device (D) is stopped due to the failure occurring in the specific state, the second forward speed is forcibly formed. In conjunction, there is a possibility that the vehicle suddenly decelerates, or that a rotational speed of the first driving force source (M1) and other rotating members become excessively high. In this regard, as described above, in the oil supply device (7) according to the present disclosure, when a failure occurs in the specific state, the state in which the first forward speed is formed can be maintained by supplying oil to the hydraulic drive portion (70) of the specific engagement device (D) from the first hydraulic pump (31) instead of the second hydraulic pump (32). Thus, the oil supply device (7) according to the present disclosure is suitable for when the transmission (6) having the above-described configuration is an oil supply target.

Here, it is preferable that the hydraulic circuit (8) have, in an oil passage that connects a first discharge port (31a) that is a discharge port of the first hydraulic pump (31) and the hydraulic drive portion (70), a first switching valve (41) that is able to switch between a first allowing state in which oil is allowed to flow from the first discharge port (31a) side to the hydraulic drive portion (70) side and a first blocked state in which oil is blocked from flowing from the first discharge port (31a) side to the hydraulic drive portion (70) side, and a state of the first switching valve (41) be switched to the first blocked state in a state in which the failure has not occurred in the specific state or a state in which the second forward speed is formed, and be switched to the first allowing state when the failure has occurred in the specific state.

According to this configuration, the hydraulic circuit (8) can be appropriately configured so that when a failure occurs in the state in which the second forward speed is formed, the state of the hydraulic circuit (8) is not switched from the first supply state to the second supply state, and when a failure occurs in the specific state, the state of the hydraulic circuit (8) is switched from the first supply state to the second supply state.

In the configuration in which the hydraulic circuit (8) includes the first switching valve (41) as described above, it is preferable that the hydraulic circuit (8) have, on an upstream side of the first switching valve (41) in an oil passage that connects the first discharge port (31a) and the hydraulic drive portion (70), a second switching valve (42) that is able to switch between a second allowing state in which oil is allowed to flow from the first discharge port (31a) side to the first switching valve (41) side and a second blocked state in which oil is blocked from flowing from the first discharge port (31a) side to the first switching valve (41) side, and a state of the second switching valve (42) be switched to the second blocked state in a state in which the second forward speed is formed, and be switched to the second allowing state in the specific state, and the state of the second switching valve (42) is maintained in the second allowing state by hydraulic pressure supplied from the first discharge port (31a) side to the second switching valve (42), even when the failure has occurred in the specific state.

According to this configuration, in the specific state, the state of the second switching valve (42) is switched to the second allowing state, and oil discharged by the first hydraulic pump (31) is supplied farther to the first switching valve (41) side than the second switching valve (42). Thus, when a failure occurs in the specific state, it is possible to realize at an early stage, the second supply state in which oil discharged from the first hydraulic pump (31) is supplied to the hydraulic drive portion (70) of the specific engagement device (D). At this time, the state of the second switching valve (42) is maintained in the second allowing state by the hydraulic pressure supplied from the first discharge port (31a) side to the second switching valve (42). Thus, it is possible to simplify the configuration for maintaining the state of the second switching valve (42) to the second allowing state when a failure occurs in the specific state.

In the oil supply device (7) of each configuration described above, it is preferable that the hydraulic circuit (8) include, in an oil passage that connects a second discharge port (32a) that is a discharge port of the second hydraulic pump (32) and the hydraulic drive portion (70), a control valve (51, 52) for controlling hydraulic pressure supplied to the hydraulic drive portion (70), the control valve (51, 52) include an input port (51a, 52a) to which oil is input from the second discharge port (32a) side, an output port (51b, 52b) that is in communication with the hydraulic drive portion (70), and a drain port (51c, 52c) that is in communication with a drain oil passage (L31, L32), and in the second supply state, oil discharged from the first hydraulic pump (31) be sequentially passed through the drain port (51c, 52c) and the output port (51b, 52b) to be supplied to the hydraulic drive portion (70).

According to this configuration, it is possible to configure the hydraulic circuit (8) so that the hydraulic circuit (8) can be switched to the second supply state in which oil discharged from the first hydraulic pump (31) is supplied to the hydraulic drive portion (70) of the specific engagement device (D), by using the control valve (51, 52) and oil passages etc. provided in the hydraulic circuit (8) for supplying hydraulic pressure from the second hydraulic pump (32) to the hydraulic drive portion (70) of the specific engagement device (D). Thus, the configuration for supplying oil discharged from the first hydraulic pump (31) to the hydraulic drive portion (70) of the specific engagement device (D) can be simplified.

As described above, in the configuration in which oil discharged from the first hydraulic pump (31) is sequentially passed through the drain port (51c) and the output port (51b) to be supplied to the hydraulic drive portion (70), it is preferable that provided in the drain oil passage (L31) be a check valve (61) that is switched from a closed state to an open state in conjunction with an increase in hydraulic pressure in the drain oil passage (L31), and that allows oil to be discharged from an inside to an outside of the drain oil passage (L31), and in the second supply state, the check valve (61) be maintained in the closed state by hydraulic pressure supplied from a first discharge port (31a) side, which is a discharge port of the first hydraulic pump (31), to the control valve (51).

According to this configuration, since the check valve (61) is maintained in the closed state in the second supply state, it is possible to appropriately supply oil discharged from the first hydraulic pump (31) in the second supply state to the hydraulic drive portion (70) of the specific engagement device (D). In this case, since the check valve (61) is maintained in the closed state by the hydraulic pressure supplied from the first discharge port (31a) side to the control valve (51), it is possible to simplify the configuration for maintaining the check valve (61) in the closed state in the second supply state.

A vehicle drive transmission device (1) includes: the oil supply device (7); a rotating electrical machine (10) that is the first driving force source (M1); the transmission (6); and an output member (3) that is drivingly coupled to the wheels (2). The transmission (6) includes a first engagement device (D1) and a second engagement device (D2) that are the two specific engagement devices (D), and a differential gear device (20). The differential gear device (20) at least includes, in an order of rotational speed, a first rotating element (E1) that is drivingly coupled to the rotating electrical machine (10), a second rotating element (E2) that is drivingly coupled to the output member (3), and a third rotating element (E3) that is selectively fixed to a non-rotating member (4) by the second engagement device (D2). Two rotating elements of the first rotating element (E1), the second rotating element (E2), and the third rotating element (E3) are coupled by the first engagement device (D1) in an engagement state or the differential gear device (20) includes the first rotating element (E1), the second rotating element (E2), the third rotating element (E3), and a fourth rotating element (E4) fixed to a non-rotating member (4) by the first engagement device (D1) in the engagement state, in an order of rotation speed. A reaction force torque that is applied to the third rotating element (E3) when the rotating electrical machine (10) outputs a normal rotation torque (T1) in a forward power running direction is a first reaction force torque (TR1), and a reaction force torque that is applied to the third rotating element (E3) when the rotating electrical machine (10) outputs a reverse rotation torque (T2) that is in a direction opposite to the normal rotation torque (T1) is a second reaction force torque (TR2). The second engagement device (D2) is configured so as to at least be able to be switched between a one-direction restriction state in which rotation of the third rotating element (E3) is restricted to one direction and a rotation restriction state in which rotation of the third rotating element (E3) is restricted in both directions, and in the one-direction restriction state, the second engagement device (D2) restricts rotation of the third rotating element (E3) in a rotation direction caused by the first reaction force torque (TR1) and allows rotation of the third rotating element (E3) caused by the second reaction force torque (TR2). The first engagement device (D1) is switched to the engagement state by hydraulic pressure being supplied to a first hydraulic drive portion (71) that is the hydraulic drive portion (70) of the first engagement device (D1), and the second engagement device (D2) is switched to the one-direction restriction state by hydraulic pressure being supplied to a second hydraulic drive portion (72) that is the hydraulic drive portion (70) of the second engagement device (D2).

In this configuration, the first forward speed is formed in the transmission (6) in the state in which hydraulic pressure is supplied to the first engagement device (D1) and the second engagement device (D2) that are the specific engagement device (D), and the second forward speed having a larger speed ratio than that of the first forward speed is formed in the transmission (6) in the state in which hydraulic pressure is not supplied to the first engagement device (D1) and the second engagement device (D2). In this configuration, since the second engagement device (D2) is switched to the one-direction restriction state by the hydraulic pressure being supplied to the second hydraulic drive portion (72), when supply of the hydraulic pressure to the second hydraulic drive portion (72) is stopped due to a failure occurring in the specific state, there is a possibility that the second engagement device (D2) is switched to the rotation restriction state and the second forward speed is forcefully formed. In contrast, as described above, in the oil supply device (7) according to the present disclosure, it is possible to supply oil to the hydraulic drive portion (70) of the specific engagement device (D) from the first hydraulic pump (31) instead of the second hydraulic pump (32) to maintain the state in which the first forward speed is formed. Thus, the oil supply device (7) according to the present disclosure is suitable for the vehicle drive transmission device (1) having the above configuration.

The oil supply device and the vehicle drive transmission device according to the present disclosure may have at least one of the effects described above.

DESCRIPTION OF THE REFERENCE NUMERALS

1: Vehicle drive transmission device
2: Wheel
3: Output member
4: Case (non-rotating member)
6: Transmission
7: Oil supply device
8: Hydraulic circuit
10: Rotating electrical machine
20: Differential gear device
31: First hydraulic pump
31a: First discharge port
32: Second hydraulic pump
32a: Second discharge port
41: First switching valve
42: Second switching valve
51: First control valve (control valve)
51a: Input port
51b: Output port
51c: Drain port
52: Second control valve (control valve)
52a: Input port
52b: Output port
52c: Drain port
61: First check valve (check valve)
70: Hydraulic drive portion
71: First hydraulic drive portion
72: Second hydraulic drive portion
D: Specific engagement device
D1: First engagement device
D2: Second engagement device
E1: First rotating element
E2: Second rotating element
E3: Third rotating element
E4: Fourth rotating element L31: First drain oil passage (drain oil passage)
L32: Second drain oil passage (drain oil passage)
M1: First driving force source
M2: Second driving force source
T1: Normal rotation torque
T2: Reverse torque
TR1: First reaction torque
TR2: Second reaction torque

The invention claimed is:

1. An oil supply device that supplies oil to a transmission provided in a power transmission path connecting a first driving force source and wheels, and
the transmission is configured to form a first forward speed by hydraulic pressure being supplied to a specific engagement device,
the oil supply device comprising:
a first hydraulic pump driven by power transmitted through the power transmission path;
a second hydraulic pump driven by a second driving force source independent from the power transmission path; and
a hydraulic circuit that supplies oil discharged by the first hydraulic pump or the second hydraulic pump to a hydraulic drive portion of the specific engagement device, wherein
in a specific state in which the first forward speed is formed by oil discharged from the second hydraulic pump being supplied to the hydraulic drive portion, when a failure occurs in which a discharge pressure of the second hydraulic pump is decreased, a state of the hydraulic circuit is switched from a first supply state in which oil discharged from the second hydraulic pump is supplied to the hydraulic drive portion to a second supply state in which oil discharged from the first hydraulic pump is supplied to the hydraulic drive portion, and
the state of the hydraulic circuit is not switched from the first supply state to the second supply state when the failure occurs in a state other than the specific state.

2. The oil supply device according to claim 1, wherein in the second supply state, a state in which the first forward speed is formed is maintained by oil discharged from the first hydraulic pump.

3. The oil supply device according to claim 2, wherein a discharge capacity of the first hydraulic pump is smaller than a discharge capacity of the second hydraulic pump.

4. The oil supply device according to claim 3, wherein the transmission is configured to form a second forward speed having a larger speed ratio than that of the first forward speed when supply of the hydraulic pressure to the specific engagement device is stopped in a state in which the first forward speed is formed.

5. The oil supply device according to claim 4, wherein
the hydraulic circuit has, in an oil passage that connects a first discharge port that is a discharge port of the first hydraulic pump and the hydraulic drive portion, a first switching valve that is able to switch between a first allowing state in which oil is allowed to flow from a first discharge port side to a hydraulic drive portion side and a first blocked state in which oil is blocked from flowing from the first discharge port side to the hydraulic drive portion side, and
a state of the first switching valve is switched to the first blocked state in a state in which the failure has not occurred in the specific state or a state in which the second forward speed is formed, and is switched to the first allowing state when the failure has occurred in the specific state.

6. The oil supply device according to claim 5, wherein
the hydraulic circuit has, on an upstream side of the first switching valve in the oil passage that connects the first discharge port and the hydraulic drive portion, a second switching valve that is able to switch between a second allowing state in which oil is allowed to flow from the first discharge port side to a first switching valve side and a second blocked state in which oil is blocked from flowing from the first discharge port side to the first switching valve side, and
a state of the second switching valve is switched to the second blocked state in a state in which the second forward speed is formed, and is switched to the second allowing state in the specific state, and
the state of the second switching valve is maintained in the second allowing state by hydraulic pressure supplied from the first discharge port side to the second switching valve, even when the failure has occurred in the specific state.

7. The oil supply device according to claim 6, wherein
the hydraulic circuit includes, in an oil passage that connects a second discharge port that is a discharge port of the second hydraulic pump and the hydraulic drive portion, a control valve for controlling hydraulic pressure supplied to the hydraulic drive portion,
the control valve includes an input port to which oil is input from a second discharge port side, an output port that is in communication with the hydraulic drive portion, and a drain port that is in communication with a drain oil passage, and
in the second supply state, oil discharged from the first hydraulic pump is sequentially passed through the drain port and the output port to be supplied to the hydraulic drive portion.

8. The oil supply device according to claim 7, wherein
provided in the drain oil passage is a check valve that is switched from a closed state to an open state in conjunction with an increase in hydraulic pressure in the drain oil passage, and that allows oil to be discharged from an inside to an outside of the drain oil passage, and
in the second supply state, the check valve is maintained in the closed state by hydraulic pressure supplied from a first discharge port side, which is a discharge port of the first hydraulic pump, to the control valve.

9. A vehicle drive transmission device comprising:
the oil supply device according to claim 8;
a rotating electrical machine that is the first driving force source;
the transmission; and
an output member that is drivingly coupled to the wheels, wherein
the specific engagement device includes two specific engagement devices,
the transmission includes a first engagement device and a second engagement device that are the two specific engagement devices, and a differential gear device,
the differential gear device at least includes, in an order of rotational speed, a first rotating element that is drivingly coupled to the rotating electrical machine, a second rotating element that is drivingly coupled to the output member, and a third rotating element that is selectively fixed to a non-rotating member by the second engagement device, two rotating elements of the first rotating element, the second rotating element, and the third rotating element are coupled by the first engagement device in an engagement state or the differential gear device includes the first rotating element, the second rotating element, the third rotating element, and a fourth rotating element fixed to a non-rotating member by the first engagement device in the engagement state, in an order of rotation speed, a reaction force torque that is applied to the third rotating element when the rotating electrical machine outputs a normal rotation torque in a forward power running direction is a first reaction force torque, and a reaction force torque that is applied to the third rotating element when the rotating electrical machine outputs a reverse rotation torque in a direction opposite to the normal rotation torque is a second reaction force torque, the second engagement device is configured so as to at least be able to be switched between a one-direction restriction state in which rotation of the third rotating element is restricted to one direction and a rotation restriction state in which rotation of the third rotating element is restricted in both directions, and in the one-direction restriction state, the second engagement device restricts rotation of the third rotating element in a rotation direction caused by the first reaction force torque and allows rotation of the third rotating element caused by the second reaction force torque, the first engagement device is switched to the engagement state by hydraulic pressure being supplied to a first hydraulic drive portion that is the hydraulic drive portion of the first engagement device, and the second engagement device is switched to the one-direction restriction state by hydraulic pressure being supplied to a second hydraulic drive portion that is the hydraulic drive portion of the second engagement device.

10. The oil supply device according to claim 1, wherein a discharge capacity of the first hydraulic pump is smaller than a discharge capacity of the second hydraulic pump.

11. The oil supply device according to claim 1, wherein the transmission is configured to form a second forward speed having a larger speed ratio than that of the first forward speed when supply of the hydraulic pressure to the specific engagement device is stopped in a state in which the first forward speed is formed.

12. The oil supply device according to claim 1, wherein the hydraulic circuit includes, in an oil passage that connects a second discharge port that is a discharge port of the second hydraulic pump and the hydraulic drive portion, a control valve for controlling hydraulic pressure supplied to the hydraulic drive portion, the control valve includes an input port to which oil is input from a second discharge port side, an output port that is in communication with the hydraulic drive portion, and a drain port that is in communication with a drain oil passage, and in the second supply state, oil discharged from the first hydraulic pump is sequentially passed through the drain port and the output port to be supplied to the hydraulic drive portion.

13. A vehicle drive transmission device comprising:
the oil supply device according to claim 1;
a rotating electrical machine that is the first driving force source;
the transmission; and
an output member that is drivingly coupled to the wheels, wherein the specific engagement device includes two specific engagement devices, the transmission includes a first engagement device and a second engagement device that are the two specific engagement devices, and a differential gear device, the differential gear device at least includes, in an order of rotational speed, a first rotating element that is drivingly coupled to the rotating electrical machine, a second rotating element that is drivingly coupled to the output member, and a third rotating element that is selectively fixed to a non-rotating member by the second engagement device, two rotating elements of the first rotating element, the second rotating element, and the third rotating element are coupled by the first engagement device in an engagement state or the differential gear device includes the first rotating element, the second rotating element, the third rotating element, and a fourth rotating element fixed to a non-rotating member by the first engagement device in the engagement state, in an order of rotation speed, a reaction force torque that is applied to the third rotating element when the rotating electrical machine outputs a normal rotation torque in a forward power running direction is a first reaction force torque, and a reaction force torque that is applied to the third rotating element when the rotating electrical machine outputs a reverse rotation torque in a direction opposite to the normal rotation torque is a second reaction force torque, the second engagement device is configured so as to at least be able to be switched between a one-direction restriction state in which rotation of the third rotating element is restricted to one direction and a rotation restriction state in which rotation of the third rotating element is restricted in both directions, and in the one-direction restriction state, the second engagement device restricts rotation of the third rotating element in a rotation direction caused by the first reaction force torque and allows rotation of the third rotating element caused by the second reaction force torque, the first engagement device is switched to the engagement state by hydraulic pressure being supplied to a first hydraulic drive portion that is the hydraulic drive portion of the first engagement device, and the second engagement device is switched to the one-direction restriction state by hydraulic pressure being supplied to a second hydraulic drive portion that is the hydraulic drive portion of the second engagement device.

14. The oil supply device according to claim 10, wherein the transmission is configured to form a second forward speed having a larger speed ratio than that of the first forward speed when supply of the hydraulic pressure to the specific engagement device is stopped in a state in which the first forward speed is formed.

15. The oil supply device according to claim 14, wherein the hydraulic circuit has, in an oil passage that connects a first discharge port that is a discharge port of the first hydraulic pump and the hydraulic drive portion, a first switching valve that is able to switch between a first allowing state in which oil is allowed to flow from a first discharge port side to a hydraulic drive portion side and a first blocked state in which oil is blocked from flowing from the first discharge port side to the hydraulic drive portion side, and a state of the first switching valve is switched to the first blocked state in a state in which the failure has not occurred in the specific state or a state in which the second forward speed is formed, and is switched to the first allowing state when the failure has occurred in the specific state.

16. The oil supply device according to claim 15, wherein the hydraulic circuit has, on an upstream side of the first switching valve in the oil passage that connects the first discharge port and the hydraulic drive portion, a second switching valve that is able to switch between a second allowing state in which oil is allowed to flow from the first discharge port side to a first switching valve side and a second blocked state in which oil is blocked from flowing from the first discharge port side to the first switching valve side, and a state of the second switching valve is switched to the second blocked state in a state in which the second forward speed is formed, and is switched to the second allowing state in the specific state, and the state of the second switching valve is maintained in the second allowing state by hydraulic pressure supplied from the first discharge port side to the second switching valve, even when the failure has occurred in the specific state.

17. The oil supply device according to claim 12, wherein provided in the drain oil passage is a check valve that is switched from a closed state to an open state in conjunction with an increase in hydraulic pressure in the drain oil passage, and that allows oil to be discharged from an inside to an outside of the drain oil passage, and in the second supply state, the check valve is maintained in the closed state by hydraulic pressure supplied from a first discharge port side, which is a discharge port of the first hydraulic pump, to the control valve.

18. The oil supply device according to claim 2, wherein the transmission is configured to form a second forward speed having a larger speed ratio than that of the first forward speed when supply of the hydraulic pressure to the specific engagement device is stopped in a state in which the first forward speed is formed.

19. The oil supply device according to claim 2, wherein the hydraulic circuit includes, in an oil passage that connects a second discharge port that is a discharge port of the second hydraulic pump and the hydraulic drive portion, a control valve for controlling hydraulic pressure supplied to the hydraulic drive portion, the control valve includes an input port to which oil is input from a second discharge port side, an output port that is in communication with the hydraulic drive portion, and a drain port that is in communication with a drain oil passage, and in the second supply state, oil discharged from the first hydraulic pump is sequentially passed through the drain port and the output port to be supplied to the hydraulic drive portion.

20. A vehicle drive transmission device comprising:
the oil supply device according to claim 2;
a rotating electrical machine that is the first driving force source;
the transmission; and
an output member that is drivingly coupled to the wheels, wherein
the specific engagement device includes two specific engagement devices,
the transmission includes a first engagement device and a second engagement device that are the two specific engagement devices, and a differential gear device,
the differential gear device at least includes, in an order of rotational speed, a first rotating element that is drivingly coupled to the rotating electrical machine, a second rotating element that is drivingly coupled to the output member, and a third rotating element that is selectively fixed to a non-rotating member by the second engagement device,
two rotating elements of the first rotating element, the second rotating element, and the third rotating element are coupled by the first engagement device in an engagement state or the differential gear device includes the first rotating element, the second rotating element, the third rotating element, and a fourth rotating element fixed to a non-rotating member by the first engagement device in the engagement state, in an order of rotation speed,
a reaction force torque that is applied to the third rotating element when the rotating electrical machine outputs a normal rotation torque in a forward power running direction is a first reaction force torque, and a reaction force torque that is applied to the third rotating element when the rotating electrical machine outputs a reverse rotation torque in a direction opposite to the normal rotation torque is a second reaction force torque,
the second engagement device is configured so as to at least be able to be switched between a one-direction restriction state in which rotation of the third rotating element is restricted to one direction and a rotation restriction state in which rotation of the third rotating element is restricted in both directions, and in the one-direction restriction state, the second engagement device restricts rotation of the third rotating element in a rotation direction caused by the first reaction force torque and allows rotation of the third rotating element caused by the second reaction force torque,
the first engagement device is switched to the engagement state by hydraulic pressure being supplied to a first hydraulic drive portion that is the hydraulic drive portion of the first engagement device, and
the second engagement device is switched to the one-direction restriction state by hydraulic pressure being supplied to a second hydraulic drive portion that is the hydraulic drive portion of the second engagement device.

* * * * *